US006832858B2

(12) United States Patent
Roth et al.

(10) Patent No.: US 6,832,858 B2
(45) Date of Patent: Dec. 21, 2004

(54) TECHNIQUES FOR FORMING FIBER OPTIC CONNECTIONS IN A MODULARIZED MANNER

(75) Inventors: Richard F. Roth, Brookline, NH (US); Sepehr Kiani, Watertown, MA (US); Joe J. George, Amherst, NH (US); William E. Howard, Richmond, VT (US)

(73) Assignee: Teradyne, Inc., Boston, MA (US)

( * ) Notice: Subject to any disclaimer, the term of this patent is extended or adjusted under 35 U.S.C. 154(b) by 181 days.

(21) Appl. No.: 10/243,458

(22) Filed: Sep. 13, 2002

(65) Prior Publication Data

US 2004/0052472 A1 Mar. 18, 2004

(51) Int. Cl.[7] .................................................. G02B 6/38
(52) U.S. Cl. ............................ 385/71; 385/72; 385/77
(58) Field of Search ........................ 385/70–72, 76–78, 385/88, 89, 92–94

(56) References Cited

U.S. PATENT DOCUMENTS

| | | | |
|---|---|---|---|
| 3,209,301 A | 9/1965 | Duffy, Jr. ...................... | 339/22 |
| 4,088,386 A | 5/1978 | Hawk ....................... | 350/96.21 |
| 4,158,476 A | 6/1979 | McCartney .............. | 350/96.21 |
| 4,258,977 A | 3/1981 | Lukas et al. ............. | 350/96.21 |
| 4,277,135 A | 7/1981 | Schrott et al. ........... | 350/96.21 |
| 4,436,366 A | 3/1984 | Abramson ................. | 350/96.2 |
| 4,456,351 A | 6/1984 | Hiramatsu et al. .......... | 354/402 |
| 4,469,398 A | 9/1984 | De Baets et al. .......... | 350/96.2 |
| 4,613,105 A | 9/1986 | Genequand et al. ........ | 248/178 |
| 4,787,706 A | 11/1988 | Cannon et al. ............. | 350/96.2 |
| 4,904,036 A | 2/1990 | Blonder .................... | 350/96.11 |
| 5,073,000 A | 12/1991 | Derfiny ....................... | 385/14 |
| 5,082,344 A | 1/1992 | Mulholland et al. .......... | 385/60 |
| 5,121,454 A | 6/1992 | Iwano et al. .................. | 385/60 |
| 5,123,073 A | 6/1992 | Pimpinella .................... | 385/59 |

(List continued on next page.)

FOREIGN PATENT DOCUMENTS

| | | | | |
|---|---|---|---|---|
| EP | 0 586 930 A3 | 3/1994 | ............ | G02B/6/38 |
| EP | 0 586 930 A2 | 3/1994 | ............ | G02B/6/38 |
| EP | 0 813 083 A1 | 12/1997 | ............ | G02B/6/43 |
| EP | 1 048 963 A1 | 11/2000 | ............ | G02B/6/38 |
| JP | 63-285961 | 11/1988 | | |
| JP | 10-74884 | 3/1998 | | |
| WO | WO 99/13367 | 3/1999 | ............ | G02B/6/26 |

OTHER PUBLICATIONS

International Search Report from International Application No. PCT/US03/34936, Date of the Actual Completion of the International Search Feb. 23, 2004, 3 pages.

(List continued on next page.)

*Primary Examiner*—Edward J. Glick
*Assistant Examiner*—Thomas R Artman
(74) *Attorney, Agent, or Firm*—Chapin & Huang, LLC; David E. Huang, Esq.

(57) ABSTRACT

A module houses a set of fiber optic interfaces. The module includes a fiber optic interface holder, which is configured to hold the set of fiber optic interfaces, and a shroud coupled to the fiber optic interface holder. The shroud is configured to move relative to the fiber optic interface holder along an axis defined by the fiber optic interface holder such that, when the fiber optic interface holder holds the set of fiber optic interfaces, the shroud (i) protects the set of fiber optic interfaces when the shroud is in a first location along the axis defined by the fiber optic interface holder, and (ii) exposes the set of fiber optic interfaces when the shroud is in a second location along the axis defined by the fiber optic interface holder.

22 Claims, 18 Drawing Sheets

U.S. PATENT DOCUMENTS

| | | | |
|---|---|---|---|
| 5,144,611 A | | 9/1992 | Engler et al. .................. 369/71 |
| 5,204,925 A | | 4/1993 | Bonanni et al. .............. 385/89 |
| 5,220,703 A | | 6/1993 | Kanayama et al. ......... 15/210.1 |
| 5,257,332 A | | 10/1993 | Pimpinella ................... 385/59 |
| 5,259,052 A | * | 11/1993 | Briggs et al. ................. 385/78 |
| 5,283,851 A | | 2/1994 | Vergnolle ................... 385/134 |
| 5,337,396 A | | 8/1994 | Chen et al. .................... 385/92 |
| 5,348,487 A | * | 9/1994 | Marazzi et al. ............. 439/138 |
| 5,379,362 A | | 1/1995 | Kawamura ................... 385/92 |
| 5,394,503 A | | 2/1995 | Dietz, Jr. et al. ........... 385/135 |
| 5,418,874 A | * | 5/1995 | Carlisle et al. ............... 385/76 |
| 5,425,831 A | | 6/1995 | Grimes et al. .............. 156/179 |
| 5,431,641 A | | 7/1995 | Grözinger et al. .......... 604/283 |
| 5,513,293 A | | 4/1996 | Holland et al. ............. 385/134 |
| 5,598,494 A | | 1/1997 | Behrmann et al. ........... 385/59 |
| 5,598,495 A | | 1/1997 | Rittle et al. ................... 385/59 |
| 5,608,829 A | | 3/1997 | Oda et al. ................... 385/576 |
| 5,725,154 A | | 3/1998 | Jackson ...................... 239/135 |
| 5,761,358 A | * | 6/1998 | Kuchenbecker et al. ...... 385/56 |
| 5,768,738 A | | 6/1998 | Lee ........................... 15/210.1 |
| 5,778,123 A | | 7/1998 | Hagan et al. ................. 385/76 |
| 5,838,856 A | | 11/1998 | Lee .............................. 385/54 |
| 5,845,028 A | | 12/1998 | Smith et al. .................. 385/59 |
| 5,845,036 A | | 12/1998 | DeMarchi ................... 385/139 |
| 5,883,995 A | * | 3/1999 | Lu ............................... 385/60 |
| 5,920,670 A | | 7/1999 | Lee et al. ...................... 385/78 |
| 5,940,560 A | | 8/1999 | DeMarchi et al. ............ 385/58 |
| 6,005,991 A | | 12/1999 | Knasel ......................... 385/14 |
| 6,041,652 A | | 3/2000 | Stewart ................... 73/504.04 |
| 6,205,700 B1 | | 3/2001 | Rigby et al. ................... 43/79 |
| 6,233,376 B1 | | 5/2001 | Updegrove ................... 385/14 |
| 6,259,840 B1 | | 7/2001 | Munoz-Bustamante et al. .......... 385/39 |
| 6,270,262 B1 | | 8/2001 | Hudgins et al. .............. 385/88 |
| 6,296,398 B1 | | 10/2001 | Lu ............................... 385/60 |
| 6,300,082 B1 | | 10/2001 | Erb et al. .................... 435/7.1 |
| 6,304,690 B1 | | 10/2001 | Day ............................. 385/24 |
| 6,305,848 B1 | | 10/2001 | Gregory ....................... 385/53 |
| 6,361,218 B1 | * | 3/2002 | Matasek et al. .............. 385/60 |
| 6,419,399 B1 | | 7/2002 | Loder et al. .................. 385/53 |
| 2003/0044125 A1 | * | 3/2003 | Kiani et al. ................... 385/78 |
| 2003/0044127 A1 | | 3/2003 | Roth et al. .................... 385/88 |
| 2004/0081406 A1 | * | 4/2004 | Grob et al. ................... 385/76 |

OTHER PUBLICATIONS

European Patent Office; Patent Abstracts of Japan; Publication No.: 2002031739; Publication Date: Jan. 31, 2002; Application No.: 2000215365; Applicant: NTT Advanced Technology Corp.; 1 Page.

New York Institute of Photography; Tips for Better Photographs; http://www.nyip.com/sub_idx_pgs/referidx/camera_corner_0599.html; 4 pages.

3M Utilities and Telecommunications: VOL–0570 VF–45™ Maintenance Cleaning Kit; http://products.3m.com/us/util_telecom/products/tsdvolition.jhtml?powurl=GSN8925771gs; Visited Site on Apr. 24, 2002; 2 Pages.

http://multimedia.mmm.com/mws/mediawebserver.dyn?666666Ozjcf6Ivs666tQ3c7rr; Visited Site on Apr. 24, 2002; 1 Page of Picture.

WO 98 35821 A (Soes Lucas; Blieck Roland Trsitan De (NL); Broeksteeg Johannes Mar) Aug. 20, 1998.

Molex, HBMT™ MT High Density Backplane Interconnect System, Mounting Style: Rivet or Screw, Housing: UL V–O.

WO 03 021320 (Teradyne Inc.) Mar. 13, 2003.

* cited by examiner

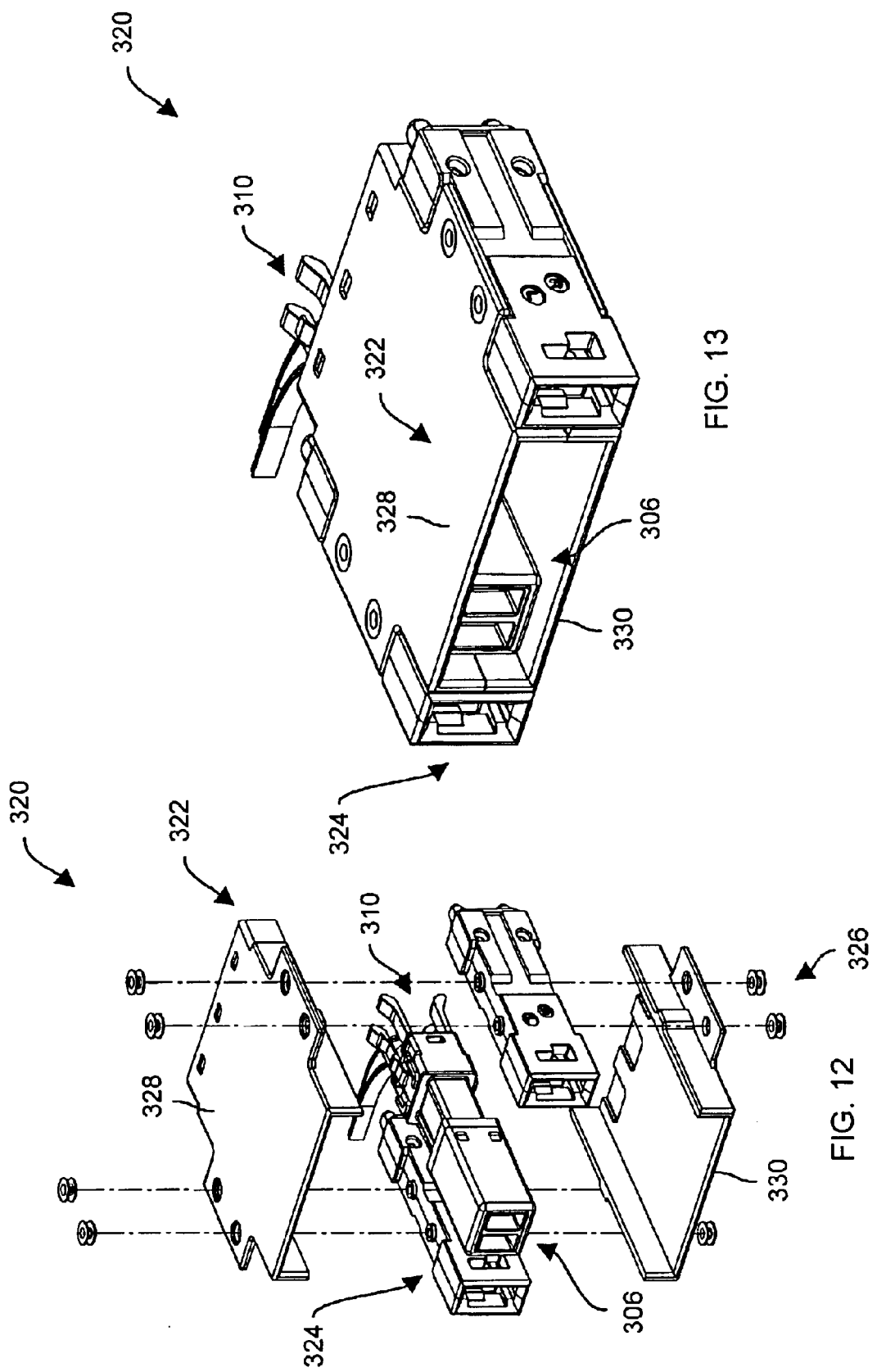

TECHNIQUES FOR FORMING FIBER OPTIC CONNECTIONS IN A MODULARIZED MANNER

BACKGROUND OF THE INVENTION

A fiber optic component such as a fiber optic network cable or a fiber optic transceiver typically includes a fiber optic connector which is designed to connect with a fiber optic connector of another component in order to form a cohesive communications medium for carrying light signals. One type of fiber optic connector includes a ferrule (e.g., a precision-molded ceramic, metal, silicon, or plastic part) which terminates a set of fiber ends (e.g., one end, four ends, eight ends, 12 ends, etc.). The manner in which the ferrule terminates the set of fiber ends typically defines one of several standard fiber optic interface formations (e.g., an MT ferrule which terminates a 1×4 array of fiber ends, a 2×4 array, a 1×12 array, etc.).

Fiber optic connectors typically include alignment structures (e.g., guide pins, alignment sleeves, etc.) that insert into, or engage around, other alignment structures to align fiber optic interfaces, which are defined by the fiber ends and the ferrules of the connectors, and thus form a set of fiber optic connections. Such fiber optic connections are separable fiber optic junctions that allow light energy to pass therethrough.

Fiber optic component manufacturers attempt to improve the reliability of their fiber optic connectors such that fiber optic signals passing through the fiber optic connections tend to be relatively error-free, and well-suited for traveling long distances. In particular, such manufacturers typically contour and clean (e.g., polish) the fiber optic interfaces so that their formed connections provide maximum light energy transfer and minimal light signal distortion.

Some fiber optic component manufacturers provide fiber optic connectors with doors to cover the fiber optic interfaces in order to maximize the ferrule cleanliness, provide eye protection and to further protect it from damage. One conventional fiber optic connector includes a fixed number of ferrule assemblies (e.g., four), and a housing, which defines an internal cavity for holding the ferrule assemblies. The connector further includes (i) a first set of doors which is hinged to the housing and which covers a first opening into the internal cavity, and (ii) a second set of doors which is also hinged to the housing and which covers a second opening on the other side of the internal cavity.

To fully assemble the connector, a technician inserts the terminated ferrule assemblies into the internal cavity defined by the housing through the first set of doors until the ferrule assemblies lock in place within the housing. That is, the ferrule assembly end-faces push the first set of doors open, and then slide into fixed positions within the housing. At this point, the fiber optic interfaces of the ferrule assemblies face the second set of doors, which are closed in the unmated condition to protect against contamination by the environment in which they are operating. Contaminants such as dirt, dust, oil, condensation, etc. are typical forms of interference which could collect within an exposed cavity and degrade optical performance. Additionally, if there are any light signals which are currently active in the system and exiting the fiber optic interfaces, such signals will hit the second set of doors rather than escape the connector and perhaps injure a bystander or technician who is looking directly into the system (e.g., eye damage caused by laser contact with the retina.)

To mate this first connector with another fiber optic connector, the technician moves the ferrule assemblies of the other connector toward the second set of doors of the first connector until the ferrule assemblies of the other connector (i) push the second set of doors open and (ii) are inserted into the internal cavity defined by the housing of the first connector. The technician continues moving the ferrule assemblies of the other connector toward the first connector until the ferrule assemblies of both connectors align (e.g., using alignment pins) and abut. A locking mechanism typically holds the ferrule assemblies together thus maintaining the formed set of fiber optic connections. A fiber optic connector which is similar to that described above is Molex Part No. 86105 which is provided by Molex Inc. of Lisle, Ill.

SUMMARY OF THE INVENTION

Unfortunately, there are deficiencies to the above-described conventional fiber optic connectors, which require the ferrule assemblies of a corresponding connector to push the connector doors open. In such a configuration, it is quite common for ferrule assemblies to become contaminated or sustain damage. It is critical that the end-faces of a fiber optic ferrule remain clean and free of any and all imperfections. By using the ferrule end-face or a corresponding alignment pin to open the door, simply increases the risk and likelihood of both of the above stated concerns.

In addition, alignment pins extending from the ferrule end-faces can bend resulting in misalignment, scratching, scraping, and/or an inability to mate. Furthermore, if the doors being contacted by the ferrules were to inadvertently bind or lock up, the doors could again cause pin or end-face damage.

Moreover, once a fiber optic interface is damaged, cost and time associated with replacing the interface can be significant.

Furthermore, the housing of the above-described conventional fiber optic connector is relatively inflexible and does not lend itself to easy scaling. That is, if the manufacturer desired a fiber optic connector with a different number of ferrule assemblies (e.g., a housing which holds six ferrule assemblies rather than four), the manufacturer is required to re-engineer the housing design to accommodate a different number of doors or differently sized doors, and almost certainly retool all the equipment associated for the new housing.

In contrast to the above-described conventional fiber optic connector which uses ferrule assemblies to push doors open, the invention is directed to fiber optic connecting techniques which use a module that houses one or more fiber optic interfaces, i.e., a set of fiber optic interfaces. (In general, the use of the term "set" within this document is intended to mean "one or more".) The module includes a shroud, which protects the set of fiber optic interfaces when in one location, and exposes the set of fiber optic interfaces when in another location. The shroud can operate in conjunction with a set of doors, which actuate in response to shroud movement. Such operation alleviates the need for door actuation in response to contact with ferrule assemblies as required by conventional fiber optic connectors thus avoiding the risk of ferrule assembly damage and contact contamination.

Furthermore, the module can be readily combined with other fiber optic connector assemblies within similar modules in a variety of configurations with no additional retooling costs, (e.g., a manufacturer can manufacture a first assembly having four modules, and a second assembly having six modules) by simply using different sized module carriers (e.g., a module housing or frame which is configured to carry the modules) fabricated using insert based tooling.

One embodiment of the invention is directed to a module for housing fiber optic interfaces. The module includes a fiber optic interface holder, which is configured to hold the optics, and a shroud coupled to the optical holder. The shroud is configured to move relative to the optical holder along an axis defined by the optical holder such that, when the optical holder holds the fiber optic interfaces, the shroud (i) protects the fiber optic interfaces when the shroud is in a first location along the axis defined by the optical holder, and (ii) exposes the fiber optic interfaces when the shroud is in a second location along the axis defined by the optical holder. In one arrangement, the shroud operates with a set of doors, which actuate in response to movement of the shroud along the axis. Such operation alleviates the need for door actuation in response to contact with ferrule assemblies in conventional fiber optic connectors thus avoiding the risk of ferrule assembly damage or contamination, while still providing the needed eye protection.

Another embodiment of the invention is directed to a method for making a fiber optic connector assembly. The method includes the steps of receiving a set of fiber optic modules similar to that described above, fitting a set of fiber optic interfaces into the set of fiber optic modules, and installing a set of latch modules and the set of fiber optic modules having the fitted set of fiber optic interfaces into a module carrier. This method enables a manufacturer to make a variety of fiber optic connector assemblies simply by varying the size of the module carrier (e.g. assembling specific long or short modularized "building blocks" necessary to meet the customers requirements) and by choosing a suitable combination of fiber optic and latch modules to be carried by the modularized carrier.

With this modularized method, each connector is essentially independent and self-contained thus enabling the manufacturer to simply change the size of the housing without concern for accommodating additional or fewer protective door and cavities.

Yet another embodiment of the invention is directed to a method for connecting to a fiber optic module having a module base which holds a set of fiber optic interfaces. The method includes the steps of (a) placing a connecting module against an end of the fiber optic module to cover the end of the fiber optic module, and (b) moving a shroud of the fiber optic module along an axis, which is defined by a fiber optic interface holder coupled to the shroud, from a first location to a second location. Accordingly, the shroud protects the set of fiber optic interfaces when the shroud is in the first location along the axis. Additionally, the shroud exposes the set of fiber optic interfaces when the shroud is in the second location along the axis. The method further includes the step of (c) precisely aligning a set of fiber optic interfaces of the connecting module with the set of fiber optic interfaces to form a set of fiber optic connections.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 12 is an exploded view of another alternative fiber optic connector assembly which is suitable for use by the connection system of FIGS. 1A and 1B.

FIG. 13 is a perspective view of the fiber optic connector assembly of FIG. 12 in a partially assembled state.

DETAILED DESCRIPTION

The invention is directed to fiber optic connecting techniques which use a module that houses a set of fiber optic interfaces. The module includes a shroud which protects the set of fiber optic interfaces when in one location, and exposes the set of fiber optic interfaces when in another location. The shroud can operate in conjunction with a set of doors which actuates in response to shroud movement. Such operation alleviates the need for door actuation in response to ferrule assembly contact as required by conventional fiber optic connectors thus avoiding the risk of ferrule assembly damage. Furthermore, the module can be combined in fiber optic connector assemblies with other modules to form a variety of configurations with minimal or no re-engineering and/or retooling (e.g., a manufacturer can manufacture a first assembly having four modules, and a second assembly having six modules) by simply using different sized module carriers (e.g., a different sized housing or frame for carrying the modules) accomplished by insert based tooling.

Figure 1A:
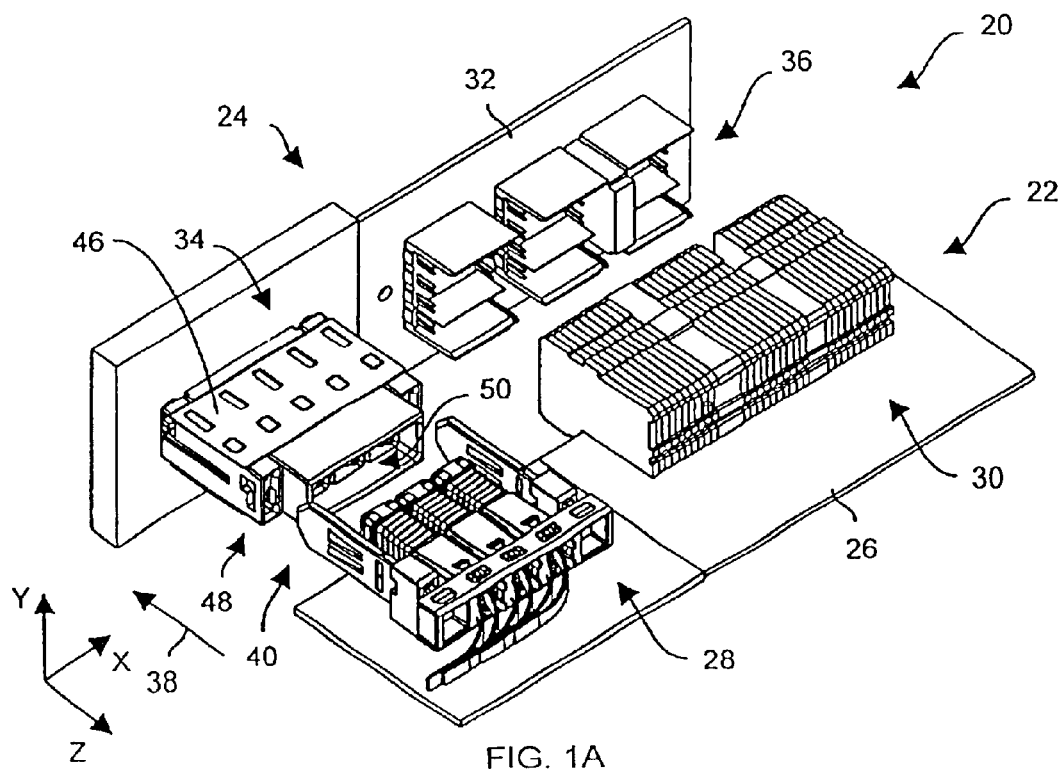
FIG. 1A is a perspective view of a connection system which is suitable for use by the invention, the connection system being in an unconnected state.
Figure 1B:
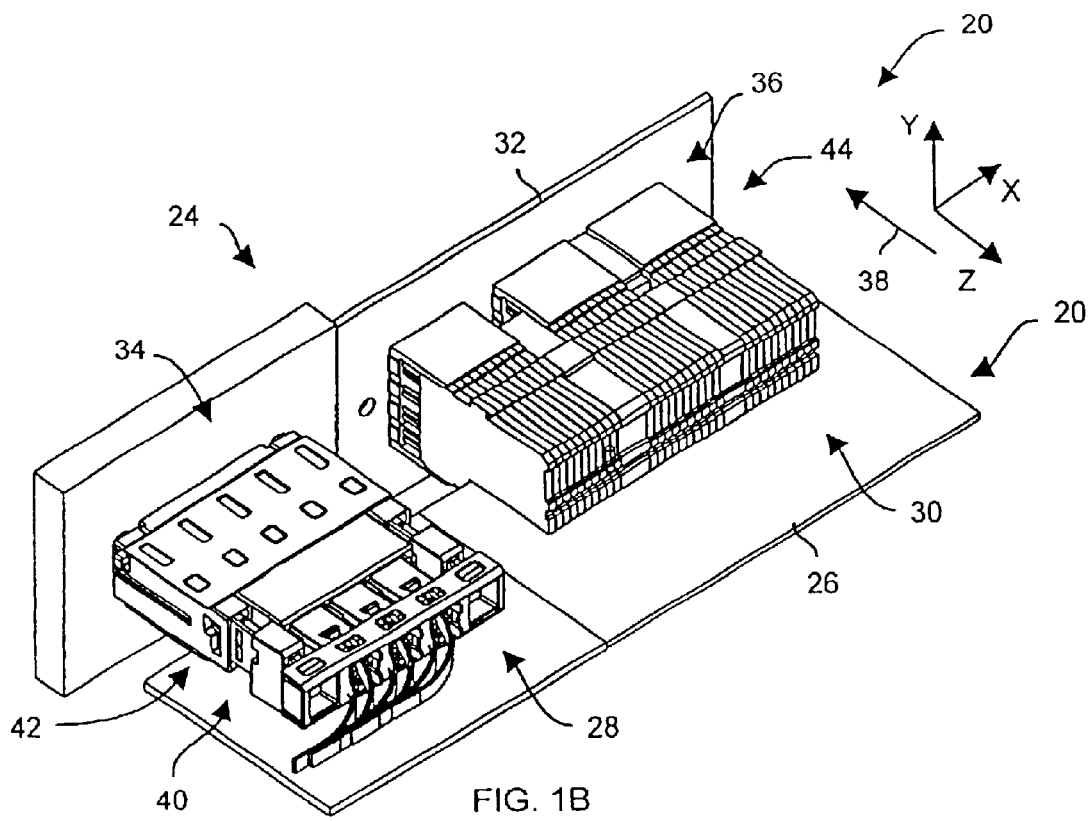
FIG. 1B is a perspective view of the connection system of FIG. 1A in a connected state.

FIGS. 1A and 1B show a connection system 20 which is suitable for use by the invention. The connection system 20 includes a first circuit board module 22 and a second circuit board module 24. By way of example only, the first circuit board module 22 is configured as a daughter card (hereinafter referred to as the daughter card 22) having a circuit board 26, a fiber optic connector assembly 28 and an electrical connector assembly 30. The second circuit board module 24 is configured as a backplane (hereinafter referred to as the backplane 24) having a circuit board 32, a fiber optic connector assembly 34 and an electrical connector assembly 36.

When the daughter card 22 connects with the backplane 24 (see FIG. 1B), the daughter card 22 moves along the Z-axis toward the backplane 24, i.e., in the negative Z-direction as shown by the arrow 38. The fiber optic connector assembly 28 of the daughter card 22 connects with the fiber optic connector assembly 34 of the backplane 24, and the electrical connector assembly 30 of the daughter card 22 connects with the electrical connector assembly 36 of the backplane 24.

In one arrangement, the fiber optic connector assemblies 28, 34 employ a latching mechanism 40, which permits substantial Z-directional movement while maintaining a set of healthy and robust fiber optic connections 42 therein. With substantial Z-directional movement available, there is little or no stress transmitted by the fiber optic connector assemblies 28, 34 to the electrical connector assemblies 30, 36 that would otherwise jeopardize electrical connectivity 44 provided by the electrical connector assemblies 30, 36 (e.g., that would fatigue and/or break solder joints, that would generate intermittent electrical contact, etc.). Rather, inaccuracies due to tolerance buildup, imprecision in component placement, and other tolerance differences, are accommodated by the latching mechanism 40 which holds connecting elements (e.g., fiber optic modules) together while allowing substantial movement of the connecting elements relative to the circuit boards 26, 32.

As will be explained in further detail shortly, the fiber optic connector assemblies 28, 34 have modular configurations that enable the manufacturer to supply a variety of fiber optic connector assembly designs with minimal or no re-engineering and retooling. For example, the fiber optic connector assembly 34 includes a single-piece housing 46, a set of latch modules 48 and a set of fiber optic modules 50. The single-piece housing 46 carries the set of latch modules 48 and the set of fiber optic modules 50.

Each fiber optic module 50 has its own shroud and set of doors (i.e., one or more doors) for selectively covering and exposing a set of fiber optic interfaces in response to shroud movement. In particular, when a particular module 50 of the fiber optic connector assembly 34 connects with a module of another fiber optic connector assembly (i.e., a corresponding module of the connector assembly 28), the shroud of that particular module 50 moves in response to butt coupling force applied to the end of the shroud from the module of the other fiber optic connector assembly. The shroud pushes back to expose the set of fiber optic interfaces thus enabling the set of interfaces to form a set of fiber optic connections. Such operation alleviates the need for contact with any ferrule assemblies when forming fiber optic connections. That is, it is unnecessary for ferrule assemblies to contact any doors as in conventional fiber optic connectors thus avoiding the risk of damaging or contaminating the fiber optic interfaces due to such contact.

Moreover, due to the individual operating nature of each module 50, the fiber optic modules 50 are essentially independent, stand-alone entities (e.g., the modules 50 do not rely on the housing 46 to selectively protect and expose the fiber optic interfaces). Accordingly, when forming a different fiber optic connector assembly configuration (e.g., when forming an assembly having a housing that carries a different number of modules 50), the manufacturer can simply change the size of the module carrier (see the housing 46) without substantially re-engineering or retooling for different sized doors or different numbers of doors, etc. Further details of the invention will now be provided with reference to FIG. 2.

Figure 2:
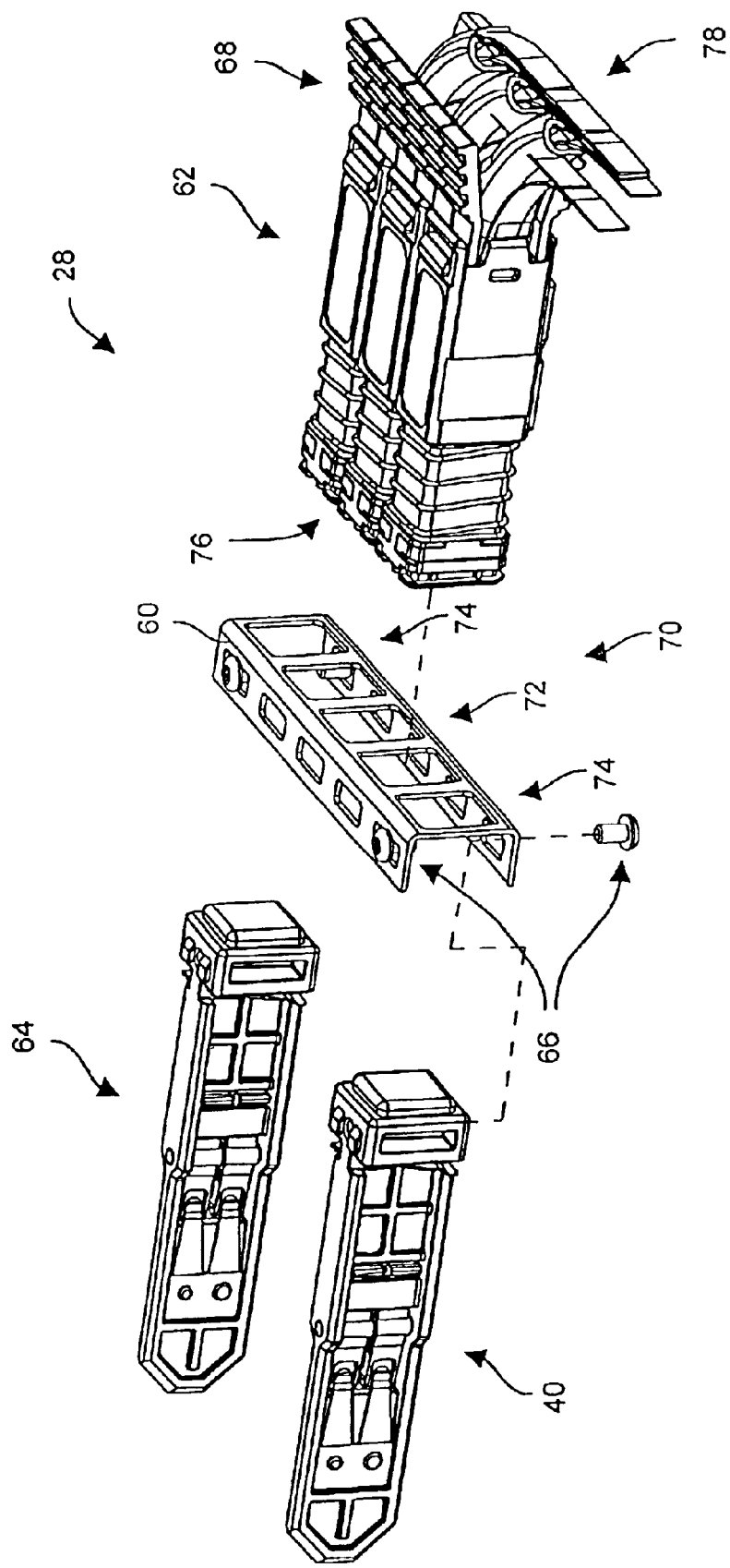
FIG. 2 is a perspective view of a fiber optic connector assembly which is suitable for use in the connection system of FIGS. 1A and 1B.

FIG. 2 shows a detailed view of the fiber optic connector assembly 28 of the connection system 20 of FIGS. 1A and 1B. As shown, the fiber optic connector assembly 28 includes a frame 60, a set of fiber optic modules 62, a set of latch modules 64, hardware 66, (e.g., screws and nuts, bolts, bushings, etc.), and a set of ferrule assemblies 68. The latch modules 64 employ the latching mechanism 40 described above.

As shown in FIG. 2, the fiber optic and latch modules 62, 64 are configured to install into the frame 60. Once the modules 62, 64 are installed, the frame 60 is carries the modules 62, 64. The hardware 66 fastens the set of fiber optic modules 62 and the set of latch modules 64 to the frame 60, as well as mounts the fiber optic connector assembly 28 to the circuit board 26 (see FIGS. 1A and 1B). The components of the fiber optic connector assembly 28 are illustrated in a partially exploded state (see dashed lines) to illustrate how the fiber optic connector assembly 28 is assembled.

As further shown in FIG. 2 and by way of example only, the frame 60 of the fiber optic connector assembly 28 is configured to carry exactly three fiber optic modules 62 and two latch modules 64 disposed in an array. In particular, the frame 60 is configured to hold the modules 62, 64 in a single row 70 with the fiber optic modules 62 disposed in the center 72 of the row 70, and the latch modules 64 disposed at ends 74 of the row 70. Other configurations are possible as well such as one in which a latching module 64 is more centrally located in the row 70, or one with multiple rows 70.

Additionally, and as shown in FIG. 2, each fiber optic module 62 includes a set of fiber optic interfaces 76 (illustrated by the arrow 76 in FIG. 2). In particular, the end of each ferrule assembly 68 includes a ferrule that terminates a set of fiber ends (i.e., one or more fiber ends) of a set of fiber optic cables 78. By way of example only, each fiber optic module 62 includes two ferrule assemblies 68. Further details of the invention will now be provided with reference to FIG. 3.

Figure 3:
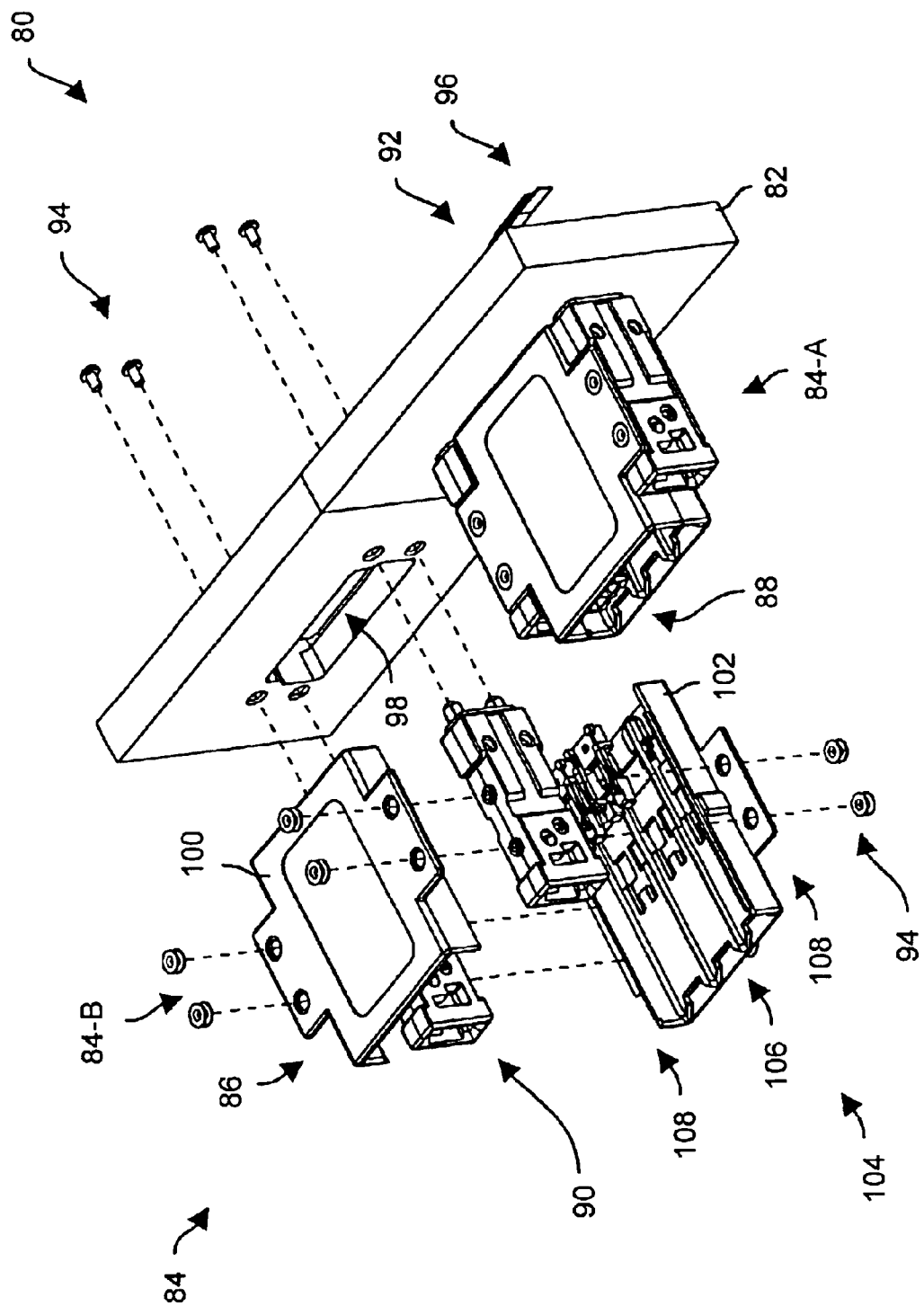
FIG. 3 is a perspective view of another fiber optic connector assembly which is suitable for use in the connection system of FIGS. 1A and 1B.

FIG. 3 shows a backplane 80 which is similar to that of the connection system 20 of FIGS. 1A and 1B. The backplane 80 includes a circuit board 82 and a set of fiber optic connector assemblies 84. The set of fiber optic connector assemblies 84 includes a first fiber optic connector assembly 84-A in a completed state, and a second fiber optic connector assembly 84-B in an exploded state to illustrate how each fiber optic connector assembly 84 is assembled. Each fiber optic connector assembly 84 is similar to the fiber optic connector assembly 34 of FIGS. 1A and 1B, and is suitable for connecting with the fiber optic connector assembly 28 of the connection system 20.

As shown in FIG. 3, each fiber optic connector assembly 84 includes a housing 86, a set of fiber optic modules 88, a set of latch modules 90, a set of ferrule assemblies 92, and hardware 94. The ferrule assemblies 92 terminate fiber optic cables 96, and extend through holes 98 defined by the circuit board 82. Although the fiber optic connector assembly 84-A is configured to carry three fiber optic modules 88, only one fiber optic module 88 is shown in FIG. 3 to illustrate the modularity of the connector assembly design. Similarly, although the fiber optic connector assembly 84-B is configured to carry three fiber optic modules 88, no fiber optic modules 88 are shown to better illustrate how the housing 86 assembles with the latching modules 90.

In contrast to the single-piece housing 46 of the fiber optic connector assembly 34 of FIGS. 1A and 1B, the housing 86 of each fiber optic connector assembly 84 of FIG. 3 is a two piece housing. That is, the housing 86 includes a top planar-shaped member 100 and a bottom planar-shaped member 102. The hardware 94 holds the members 100, 102 together enabling the housing 86 to retain the set of fiber optic modules 88 and the set of latch modules 90. The hardware 94 also mounts the fiber optic connector assembly 84 to the circuit board 82.

As further shown in FIG. 3 and by way of example in order to correspond to the fiber optic connector assembly 28 of FIGS. 1A, 1B and 2, the housing 86 of each fiber optic connector assembly 84 is configured to carry two latch modules 90 and three fiber optic modules 88. In particular, the housing 86 is configured to hold the modules 88, 90 in an array. Specifically, the housing 86 holds the modules 88, 90 in single row 104 with the fiber optic modules 88 disposed in the center 106 of the row 104, and the latch modules 90 at the ends 108 of the row 104. Other configurations are possible as well such as putting a latch module 90 in a central area of the row 104, or having multiple rows 104 in order to match a different opposing fiber optic connector assembly.

As mentioned above, the fiber optic connector assemblies 28, 34, 84 have modular configurations. The fiber optic modules 50, 62, 88 of these assemblies 28, 34, 84 operate as individual, standalone connecting elements. That is, each module 50, 62, 88 has its own shroud for selectively protecting and exposing a set of fiber optic interfaces (i.e., a set of fiber ends disposed within a ferrule). Accordingly, the housings for such assemblies 28, 34, 84 are relatively simple and no significant re-engineering or retooling is required when changing to a different modular configuration (e.g., the manufacturer does not need to develop a new sized door or change the number of doors, etc.).

It should be understood that the fiber optic connector assemblies 28, 34, 84 are easy to scale. For example, if a manufacturer currently manufactures a connector assembly having three fiber optic modules and wishes to increase the capacity of the connector assembly by adding another fiber optic module, the manufacturer can simply increase the size of the module carrier (see the frame 50 in FIG. 2 and the housing 86 in FIG. 3). Furthermore, if additional latching strength is required to support the additional fiber optic module, extra space can be included within the central region to accommodate another latch module. There is no substantial re-engineering or retooling required (e.g., the manufacture does not need to redesign a new door mechanism). A modular connector assembly which is similar to that explained above is described in U.S. patent application Ser. No. 10/195,960, filed Jul. 16, 2002, and entitled "Modular Fiber Optic Connection System," the teachings of which are hereby incorporated by reference in their entirety.

In one arrangement, the latch modules 64, 90 are different and complementary in order to perform a latching function (i.e., a first module defines a blade-shaped portion, and the other defines a cavity to receive the blade-shaped portion of the first module, see FIGS. 1A, 1B, 2 and 3). Latch modules similar to those mentioned above are described in U.S. patent application Ser. No. 10/195,288, filed Jul. 15, 2002, and entitled "Techniques for Connecting a Set of Connecting Elements Using an Improved Latching Apparatus," the teachings of which are hereby incorporated by reference in their entirety.

Although the fiber optic modules 50, 62, 88 of the fiber optic connector assemblies 28, 34, 84 are not required to be identical, in one arrangement, they have the same design so that the manufacturer simply needs to make and stock one type of fiber optic module. Further details of such a module will now be provided with reference to FIG. 4.

Figure 4:
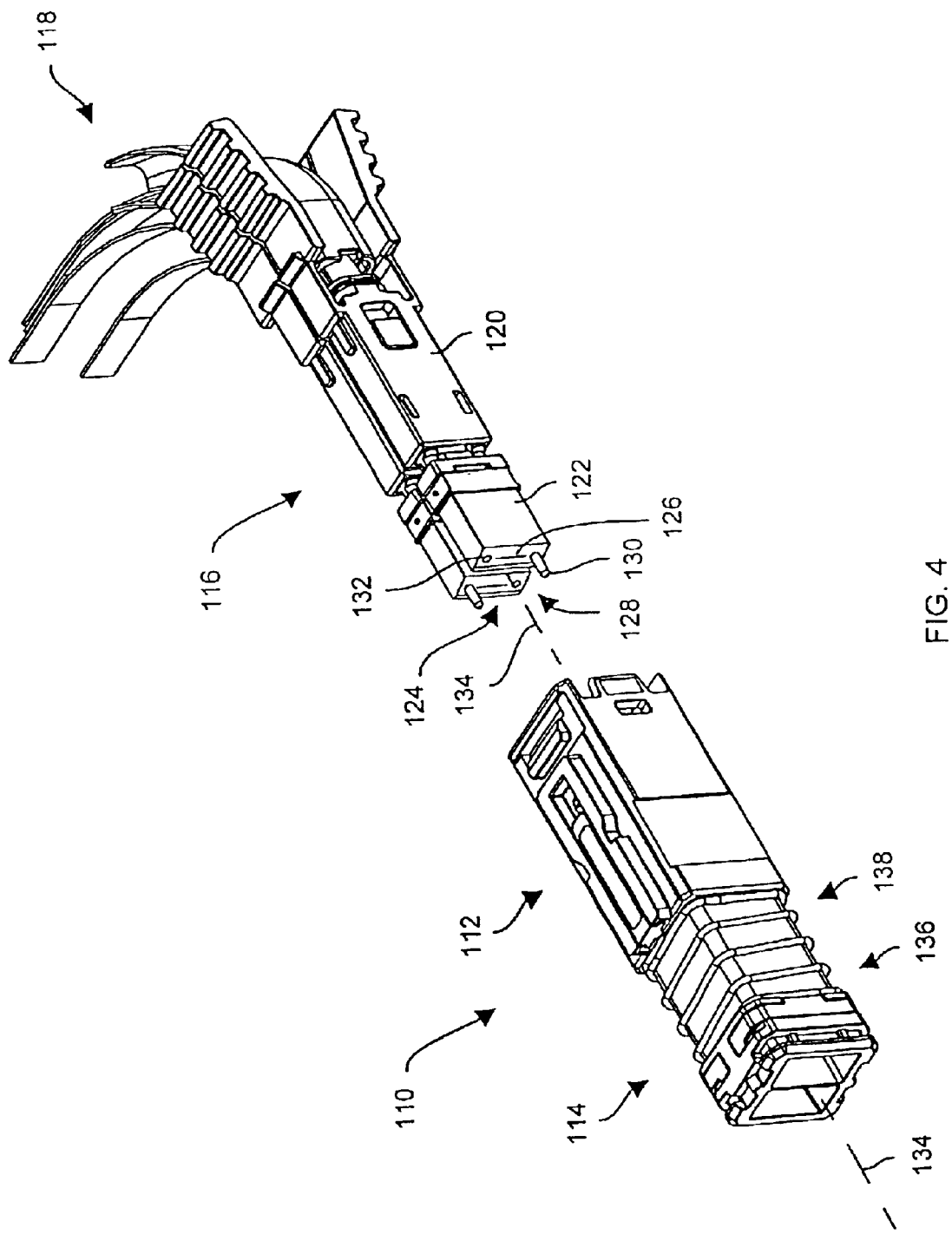
FIG. 4 is a perspective view of a fiber optic module assembly which is suitable for use in the fiber optic connector assemblies of FIGS. 2 and 3.

FIG. 4 shows a fiber optic module 110 which is suitable for use in any of the above-described fiber optic connector assemblies 28, 34, 84 (e.g., the module 110 is suitable as any of the modules 50, 62, 88 of FIGS. 1A, 1B, 2 and 3). Additionally, the fiber optic module 110 is well suited for use in the fiber optic connection system described in above-identified U.S. patent application Ser. No. 10/195,960.

As shown in FIG. 4, the fiber optic module 110 includes, among other things, a fiber optic interface holder 112 and a shroud 114 which is coupled to the fiber optic interface holder 112. The shroud 114 defines a face which is substantially rectangular in shape. The fiber optic interface holder 112 is configured to hold a set of ferrule assemblies 116 (e.g., also see the ferrule assemblies 68 and 92 in FIGS. 2 and 3).

Each ferrule assembly 116 terminates an end of a fiber optic cable 118. In particular, each ferrule assembly 116 includes a base portion 120 and a spring-loaded ferrule 122 supported by the base portion 120. The base portion 120 loosely supports a portion of the fiber optic cable 118, and the ferrule 122 exposes a set of fiber ends 124 of the cable 118 (i.e., one or more fiber ends). The set of fiber ends 124 and a facing 126 of the ferrule 122 define a fiber optic interface 128 (e.g., an MT ferrule formation). In one arrangement, each ferrule assembly 116 further includes a set of alignment pins 130 (i.e., one or more pins 130) which is configured to engage with a set of alignment holes 132 of a corresponding ferrule assembly to properly align fiber optic interfaces.

When the set of ferrule assemblies 116 are installed within the fiber optic interface holder 112, the shroud 114 is movable along an axis 134 defined by the fiber optic interface holder 112 to control access to the set of fiber optic interfaces 128. In one arrangement, each ferrule assembly 116 inserts into the fiber optic interface holder 112 along the axis 134. When the shroud 114 is in a first location 136 along the axis 134 relative to the fiber optic interface holder 112, the shroud 114 protects the set of fiber optic interfaces 128. Additionally, when the shroud 114 is in a second location 138 along the axis 134 relative to the fiber optic interface holder 112 (e.g., when the shroud 114 and the fiber optic interface holder 112 compress over each other, the shroud 114 exposes the set of fiber optic interfaces 128. Further details of the invention will now be provided with reference to FIG. 5.

Figure 5:
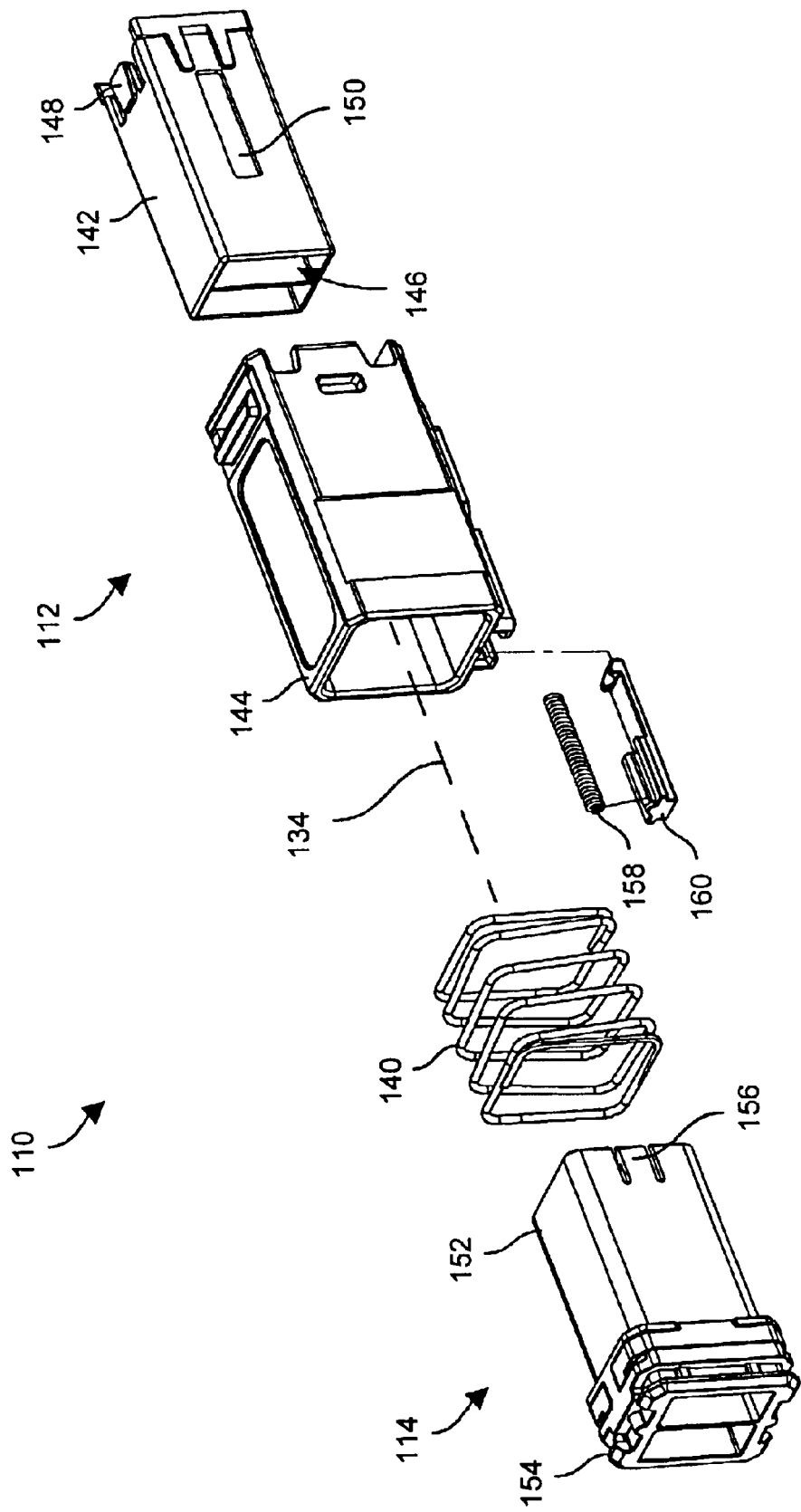
FIG. 5 is an exploded view of a fiber optic module of the fiber optic module assembly of FIG. 4.

FIG. 5 shows a partially exploded view of the fiber optic module 110 to illustrate construction of the fiber optic module 110. In addition to the fiber optic interface holder 112 and the shroud 114, the fiber optic module 110 further includes a spring 140 that biases the shroud 114 to the first location 136 and away from the second location 138 relative to the fiber optic interface holder 112 (also see FIG. 4). Accordingly, when the set of ferrule assemblies 116 are installed within the module 110 but when the module 110 is unconnected with another module, the shroud 114 covers the set of fiber optic interfaces 128 of the set of ferrule assemblies 116. As a result, the shroud 114 protects the set of fiber optic interfaces 128 while the module 110 is unconnected.

As further shown in FIG. 5, the fiber optic interface holder 112 includes an inner portion 142 and an outer portion 144. The inner portion 142 defines a set of cavities 146 within which the ferrule assemblies 118 reside, a set of bosses 148 for retaining the inner portion 142 within the outer portion 144, and a set of grooves 150.

Additionally, and as shown in FIG. 5, the shroud 114 includes a support portion 152 (or sleeve 152), an actuator portion 154 (or face member 154) and a set of tabs 156. The sleeve-shaped support portion 152 is configured to slide over the inner portion 142 of the fiber optic interface holder 112, and the set of tabs 156 is configured to engage with the set of grooves 150 of the fiber optic interface holder 112 in order to prevent the shroud 114 from escaping from the fiber optic interface holder 112 (e.g., to prevent the shroud 114 from disconnecting from the inner portion 142 in response to biasing by the spring 140). As will be explained in further detail shortly, the actuator portion 154 is movable relative to the support portion 152 in order to actuate a set of doors, which selectively close and open over the set of fiber optic interfaces 128.

The spring 140 is externally disposed around the inner portion 142 of the fiber optic interface holder 112 and the support portion 152 of the shroud 114 to minimize volume dedicated to the spring 140. That is, with the externally disposed spring 140, the module 110 has a very small profile which is well suited for very high density applications.

Figure 6A:
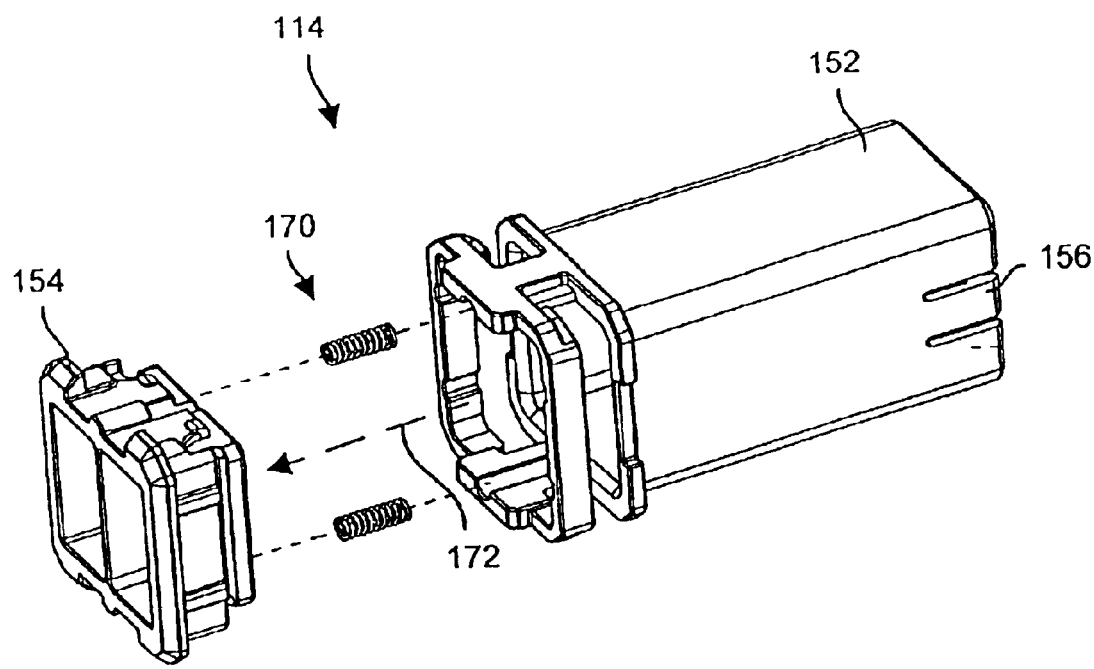
FIG. 6A is a partially exploded view of a shroud illustrating a set of springs of the fiber optic module of FIG. 5.
Figure 6B:
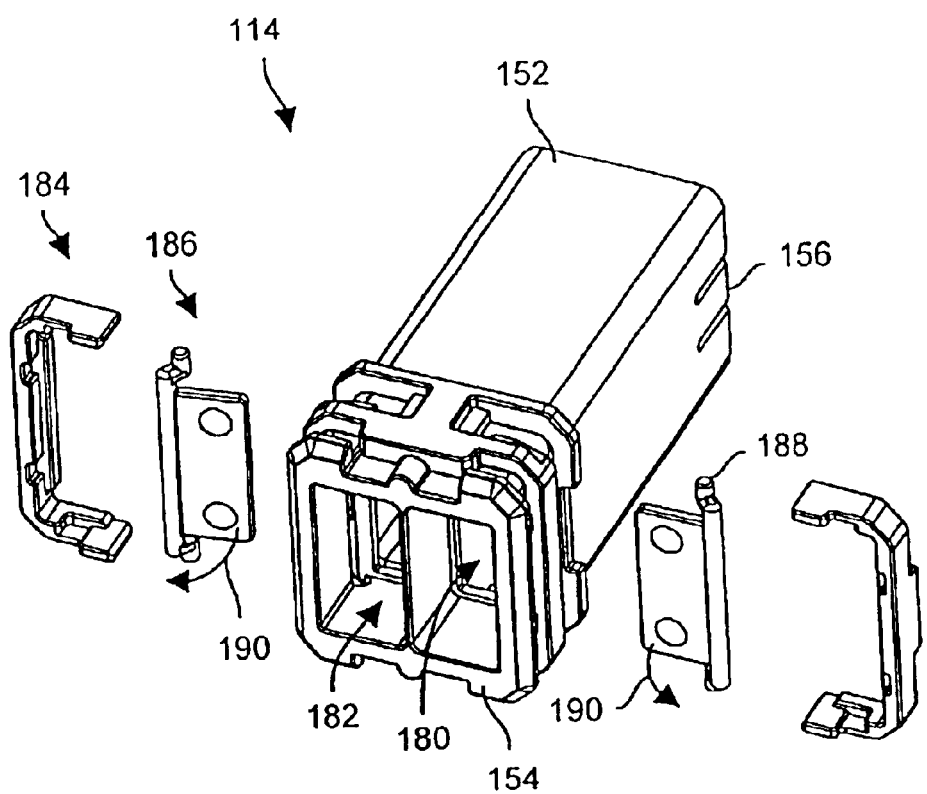
FIG. 6B is another partially exploded view of the shroud illustrating a set of doors of the fiber optic module of FIG. 5.

Further details of the invention will now be provided with reference to FIGS. 6A and 6B.

FIGS. 6A and 6B show partially exploded views of the shroud 114 of the fiber optic module 110 of FIGS. 4 and 5. As shown in FIG. 6A, the actuator portion 154 couples to the support portion 152 in a spring-loaded manner. That is, the shroud 114 further includes a set of springs 170 which biases the actuator portion 154 in a direction 172 away from the support portion 152. However, in response to force applied to the actuation portion 154 in the opposite direction (i.e., in response to butt coupling force applied by another module in the direction opposite the arrow 172) which overcomes the biasing force provided by the set of springs 170, the actuator portion 154 is configured to move toward the support portion 152 in that opposite direction.

As shown in FIG. 6B, the shroud 114 defines a set of inner cavities 180 and a set of external regions 182 through which the set of ferrule assemblies 118 is configured to extend (also see FIG. 4). That is, when the module 110 is unconnected, the set of ferrules 122 of the set of ferrule assemblies 118 reside within the set of inner cavities 180. Additionally, when the shroud 114 moves toward the fiber optic interface holder 112 along the axis 134 (e.g., in response to butt coupling force from another module), the shroud 114 compresses over the fiber optic interface holder 112 such that the set of ferrules 122 extend through the set of external regions 182 to form a set of fiber optic connections with another module.

As further shown in FIG. 6B, the shroud 114 further includes a set of retaining members 184 and a set of doors 186. The set of doors 186 install onto the support portion 152 such that the set of doors 186 selectively close and open to separate and connect the sets of inner cavities and external regions 180, 182. The set of retaining members 184 install onto the support portion 152 after installation of the set of doors 186 in order to capture and retain the set of doors 186. In one arrangement, the set of retaining members 184 clip onto the support portion 152 and prevent the offset hinged arms 188 from escaping a set of notches defined by the support portion 152.

In one arrangement, each door 186 includes a set of offset hinged arms 188 which is configured to actuate in response to movement of the actuator portion 154 relative to the support portion 152. In particular, when the actuator portion 154 is biased away from the support portion 152 by the set of springs 170 (see FIG. 6A), the actuator portion 154 provides a surface against the set of offset hinged arms 188 to close the set of doors 186 (i.e., the doors 186 are substantially perpendicular to the axis 134 as shown in FIG. 6B). However, when the actuator portion 154 is biased toward the support portion 152 by a force applied against the actuator portion 154 (in a direction opposite the arrow 172 of FIG. 6A), the actuator portion 154 provides a surface against the set of offset hinged arms 188 to open the set of doors 186, i.e., the doors 186 move as illustrated by the arrows 190 to connect the set of inner cavities 180 with the set of external regions 182 (see FIG. 6B).

By way of example only, the doors 186 are configured to open in the outward direction 190 (i.e., away from the fiber optic interfaces 128 of the ferrules 122 during actuation). Accordingly, any external dirt or debris in the vicinity of the doors 186 (e.g., in the external regions 182 of the module 110 is kept away from the fiber optic interfaces 128 rather than drawn toward the fiber optic interfaces 128.

It should be understood that, when the fiber optic module 110 is unconnected and when a set of ferrule assemblies 118 is installed within the fiber optic module 110, the set of fiber optic interfaces 128 is well shielded against damage and contamination. In particular, the spring 140 (FIGS. 4 and 5) biases the shroud 114 to the location 136 relative to the fiber optic interface holder 112, and the set of springs 170 (FIGS. 6A and 6B) biases the actuator 154 relative to the support portion 152 such that (i) the set of ferrules 122 reside within the set of cavities 180 and (ii) the set of doors 186 is closed over the set of fiber optic interfaces 128. Accordingly, the set of fiber optic interfaces 128 external objects such as dirt cannot penetrate into the set of cavities 180 and damage the set of fiber optic interfaces 128. Furthermore, if the set of fiber optic interfaces 128 is active, any light signals exiting the set of fiber optic interfaces 128 will strike the set of doors 186 rather than escape and potentially injure a bystander.

It should be further understood that the fiber optic module 110 is configured to operate in a two-stage manner. In particular, the spring forces of the spring 140 and the set of springs 170 are set such that the set of springs 170 compress first, and the spring 140 compresses next. Accordingly, when the module 110 butt couples with another module, force applied against the actuator portion 154 by the other module first overcomes the spring force resistance of the set of springs 170. Accordingly, the set of springs 170 compresses thus enabling the actuator portion 154 to move toward the support portion 152 (i.e., the actuator portion 154 moves in the direction opposite the arrow 172 in FIG. 6A). In turn, the set of doors 186 rotate from closed positions which cover the sets of fiber optic interfaces 128 to open positions which expose the sets of fiber optic interfaces 128 in response to movement of the actuator portion 154 relative to the support portion 152 (i.e., in response to pressure from a surface of the actuator portion 154 against the offset hinged arms 188 of the set of doors 186.

As the force applied against the actuator portion 154 toward the support portion 152 increases, the force overcomes the spring force resistance of the spring 140 (FIGS. 4 and 5). As a result, the shroud 114 moves over the fiber optic interface holder 112 compressing the spring 140. The length of the module 110 shrinks thus enabling the set of fiber optic interfaces 128 of the set of ferrule assemblies 118 to move from the set of inner cavities 180, past the set of doors 186 which is now open, and into the set of external regions 182 for connection with a set of corresponding fiber optic interfaces of another module (FIGS. 6A and 6B).

It should be understood that, in some connection situations, the modules of the fiber optic connector assemblies 28, 34, 84 may contact each other abruptly with a high degree of force. In conventional fiber optic connection systems, the force may push fiber optic interfaces roughly against doors and the corresponding mating ferrule causing damage to the fiber optic interfaces (e.g., bending alignment pins, scratching ferrule ends, etc.). In the context of the modules 110, the actuator portions 154 act as shock-absorbing faces which dampen the contact forces endured by the modules 110. Accordingly, the forces between the modules during connection are less abrupt thus minimizing the potential for damage. Further details of the operation of the fiber optic module 110 will now be provided with reference to FIGS. 7A through 7F.

FIGS. 7A through 7F illustrate operations of two fiber optic modules 10-A, 110-B when they connect to form a set of fiber optic connections (e.g., see the set of fiber optic connections 42 of FIG. 1B). Although FIGS. 7A through 7F show only one ferrule assembly 118 for each module 110-A, 110-B for simplicity, it should be understood that, in some arrangements, each module 110-A, 110-B actually includes multiple ferrule assemblies 118 (e.g., two ferrule assemblies 118), and that the operations illustrated in FIGS. 7A through 7F apply to each ferrule assembly 118. It should be further understood that the modules 110-A, 110-B can reside in connector assemblies with other modules 110, and that multiple modules 110 can connect together concurrently to form multiple sets of fiber optic connections.

Figure 7A:
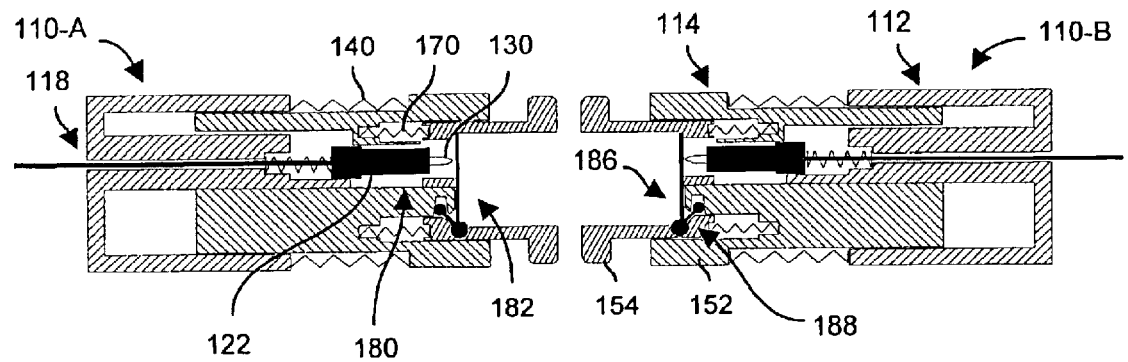
FIG. 7A is a detailed cross-sectional view of two modules having the design of FIG. 5 which are about to mate with each other to form a set of fiber optic connections.

As shown in FIG. 7A, the modules 110-A, 110-B initially face each other. This is the situation that occurs when two fiber optic connector assemblies align just prior to connecting (e.g., see the fiber optic connector assemblies 28, 34 of FIGS. 1A and 1B). At this time, the sets of doors 186 of the modules 110-A, 110-B are closed due to biasing of the set of springs 170 in each module 110-A, 110-B by the actuator portion 154. Additionally, the shrouds 114 are biased forward due to biasing from the springs 140 as described earlier in connection with FIGS. 4, 5, 6A and 6B (see the location 136 along the axis 134 in FIG. 4). Since the sets of doors 186 are closed and the shrouds 114 extend over the ferrules 122 of the ferrule assemblies 118, the ferrules 122 are well protected against damage (e.g., against contamination, against damage from inadvertent contact with an external object, etc.). In particular, any contaminants in the external regions 182 of the modules 110-A, 110-B are kept away from the fiber optic interfaces 128 (also see FIG. 4). Furthermore, if the modules 110-A, 110-B are active, any light escaping from the ferrules 122 will strike the back sides of the doors 186 rather than escape and possibly cause eye injury to a bystander.

Figure 7B:
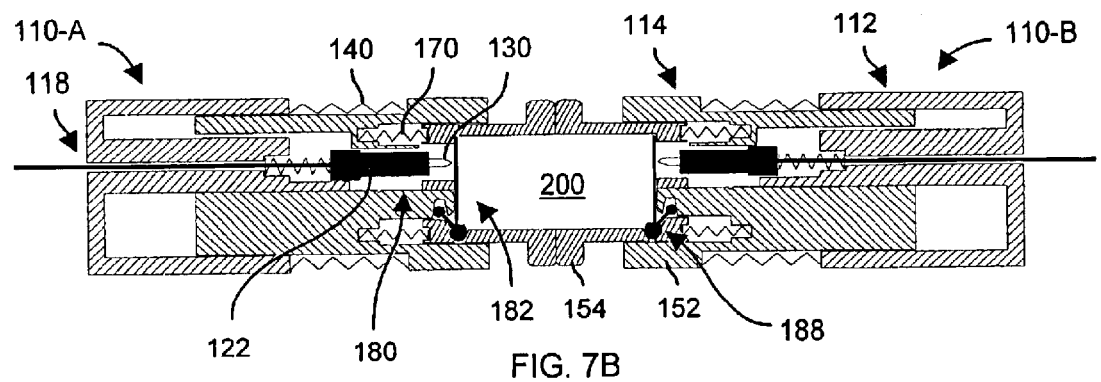
FIG. 7B is a detailed cross-sectional view of the two modules of FIG. 7A in an early butt coupled state where the module doors are still closed.

In FIG. 7B, the modules 110-A, 110-B butt couple to each other. That is, the end faces of the modules 110-A, 110-B make contact and any further movement of the modules 110-A, 110-B toward each other results in module compression. It should be understood that, at this point, the external regions 182 are now combined to form a single enclosed cavity 200, which is sealed from the external surroundings although the doors 186 are still closed. Accordingly, contaminants (e.g., dust, dirt, grease, etc.) can no longer enter the external regions 182. In one arrangement, users of the modules are urged to clean the external regions 182 prior to connecting the modules as shown in FIGS. 7A and 7B (e.g., blow dry air or inert gas, apply a vacuum, etc.). Some module cleaning techniques which are suitable for use by the invention are described in U.S. application Ser. No. 10/156, 905, filed May 29, 2002, and entitled "Methods and Apparatus for Cleaning Optical Connectors", the teachings of which are hereby incorporated by reference in their entirety.

Figure 7C:
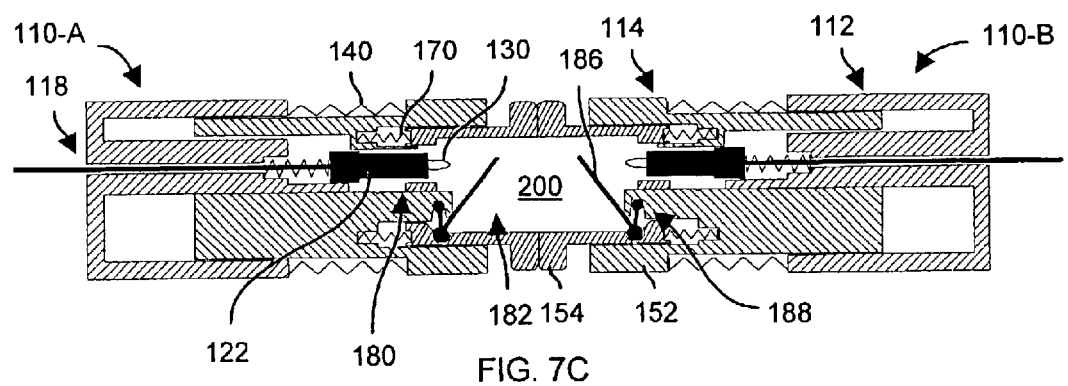
FIG. 7C is a detailed cross-sectional view of the two modules of FIG. 7B in a further butt coupled state, where the module doors are partially opened.

In FIG. 7C, the modules 110-A, 110-B move closer together. As this occurs, each module 110-A, 110-B applies force to the end of the other module 110-A, 110-B. Recall that the sets of springs 170 are configured to compress prior to the springs 140. Accordingly, the sets of springs 170 compress in response to the applied forces, and the actuator portions 154 of the shrouds 114 move toward the support portions 152 of the shrouds 114 while the springs 140 remain substantially uncompressed. As a result, the actuator portions 154 move the offset hinged arms 188 of the doors 186 to open them while the shrouds 114 substantially remain in the extended locations 136 along the axis 134 (also see FIG. 4). By way of example, the doors 186 open away from the ferrules 122 thus keeping any contaminants away from the fiber optic interfaces 128 of the ferrules 122.

It should be understood that the doors 186 actuate without contacting the ferrules 122. That is, the doors 186 opened in response to butt coupling force applied to the actuator 154 and, as a result, no contact from any ferrules is needed to open the doors 186. Accordingly, there is no risk of damaging fiber optic interfaces from door contact as in conventional connectors which require ferrule assemblies to push doors open. Nevertheless, in accordance with one arrangement, if the doors 186 were to bind inadvertently, the ferrules 122 could facilitate movement of the doors 186 for proper actuation by pushing the doors 186 open.

Figure 7D:
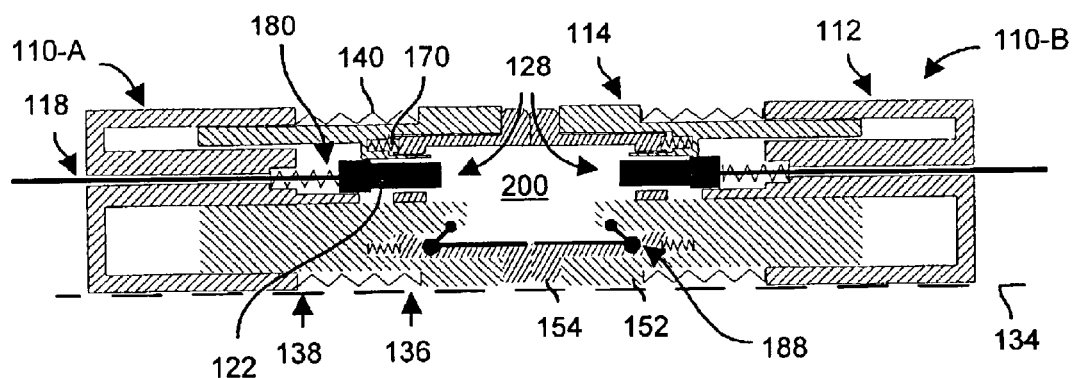
FIG. 7D is a detailed cross-sectional view of the two modules of FIG. 7C in yet a further butt coupled state, where the module doors are fully opened.

In FIG. 7D, the doors 186 are fully open and the sets of springs 170 are substantially compressed. Accordingly, as the modules 110-A, 110-B continue to move toward each other, the springs 140 now begin to substantially compress. In response, the shrouds 114 move from their positions 136 along the axis 134 defined by the modules 110-A, 110-B to new positions 138. The ferrules 122 begin to move out of the inner cavities 180 and past the hinged areas of the doors 186 toward each other exposing the fiber optic interfaces 128.

Figure 7E:
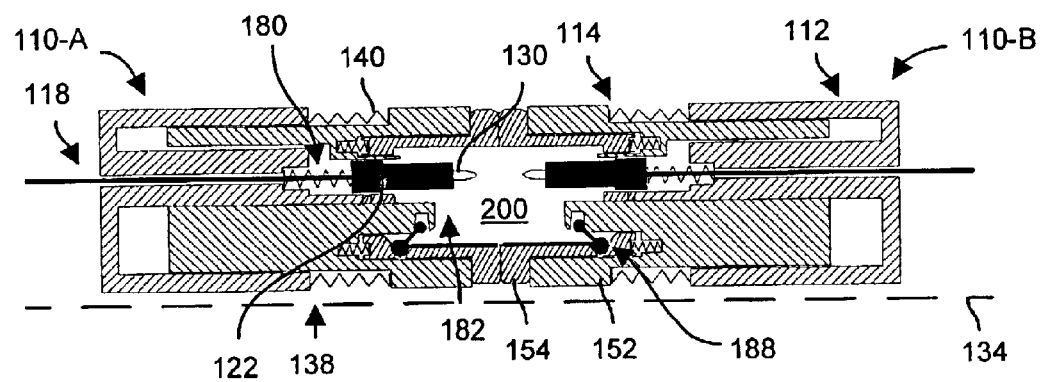
FIG. 7E is a detailed cross-sectional view of the two modules of FIG. 7D in a butt coupled state, where the ferrules are moving toward each other.

In FIG. 7E, the springs 140 continue to compress and allow the shrouds 114 to move over the fiber optic interface holders 112 to their positions 138 along the axis 134. Accordingly, the shrouds 114 further expose the ferrules 122, and the ferrules 122 continue to move out of the inner cavities 180 and toward each other within the single enclosed cavity 200.

Figure 7F:
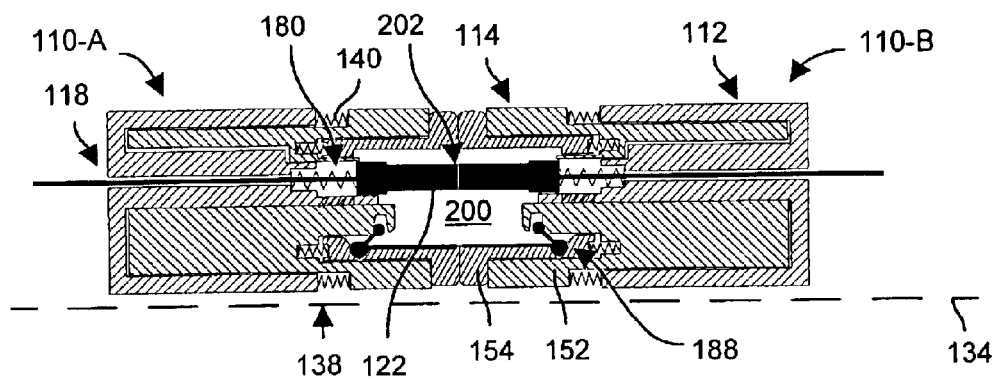
FIG. 7F is a detailed cross-sectional view of the two modules of FIG. 7E when completely connected to form a set of fiber optic connections.

In FIG. 7F, the shrouds 114 have been pushed back to the locations 138 along the axis 134 thus fully exposing the fiber optic interfaces 128 (also see FIG. 4). Here, the ferrules 122 contact each other such that the fiber optic interfaces 128 form a set of robust fiber optic connections 202. In particular, the alignment pins 130 engage corresponding alignment holes in the opposing ferrules 122 to ensure proper alignment of fiber ends, and springs within the ferrule assemblies 118 compress to provide sustained force between the ferrules 122. Furthermore, when the modules 110-A, 110-B are installed within fiber optic connector assemblies with latch modules, it should be understood that, at this point, the modules 110-A, 110-B no longer move toward each other due to proper latching of latch modules (see FIGS. 1A and 1B). Accordingly, the modules 110-A, 110-B are held together and the formed set of fiber optic connections 202 (i.e., one or more fiber optic connections) is maintained. Such formation of the set of fiber optic connections occurred without any ferrules 122 contacting the doors 186. Thus, risk of damaging the fiber optic interfaces 128 (e.g., bending alignment pins, scratching the fiber optic interface surface, etc.) is avoided.

It should be understood that disconnection of the modules 110-A, 110-B (e.g., un-mating of fiber optic connector assemblies) results in operation of the modules 110-A, 110-B in reverse order. In particular, the ferrules 112 disengage from each other and retract into the inner cavities 180 defined by the shrouds 114 due to biasing of the springs 140 which pushes the shrouds 114 away from the fiber optic interface holders 112 and back over the fiber optic interfaces 128. Then, the sets of springs 170 bias the actuator portions 154 away from the support portions 152. As the actuator portions 154 move away from the support portions 152, surfaces of the actuator portions 154 push the offset hinged arms 188 thus closing the doors 186. Accordingly, while the modules 110-A, 110-B remain butt coupled thus forming the enclosed cavity 200, the doors 186 close to further protect the fiber optic interfaces 128. As a result, when the modules 110-A, 110-B are moved away from each other thus breaking the sealed cavity 200, the fiber optic interfaces 128 remain isolated from the external surroundings by the shrouds 114 and the sets of doors 186. Thus, the fiber optic interfaces 128 are shielded from contamination, and bystanders remain protected from any light signals that may emanate from the fiber optic interfaces 128. Further details of the invention will now be provided with reference to FIG. 8.

Figure 8:
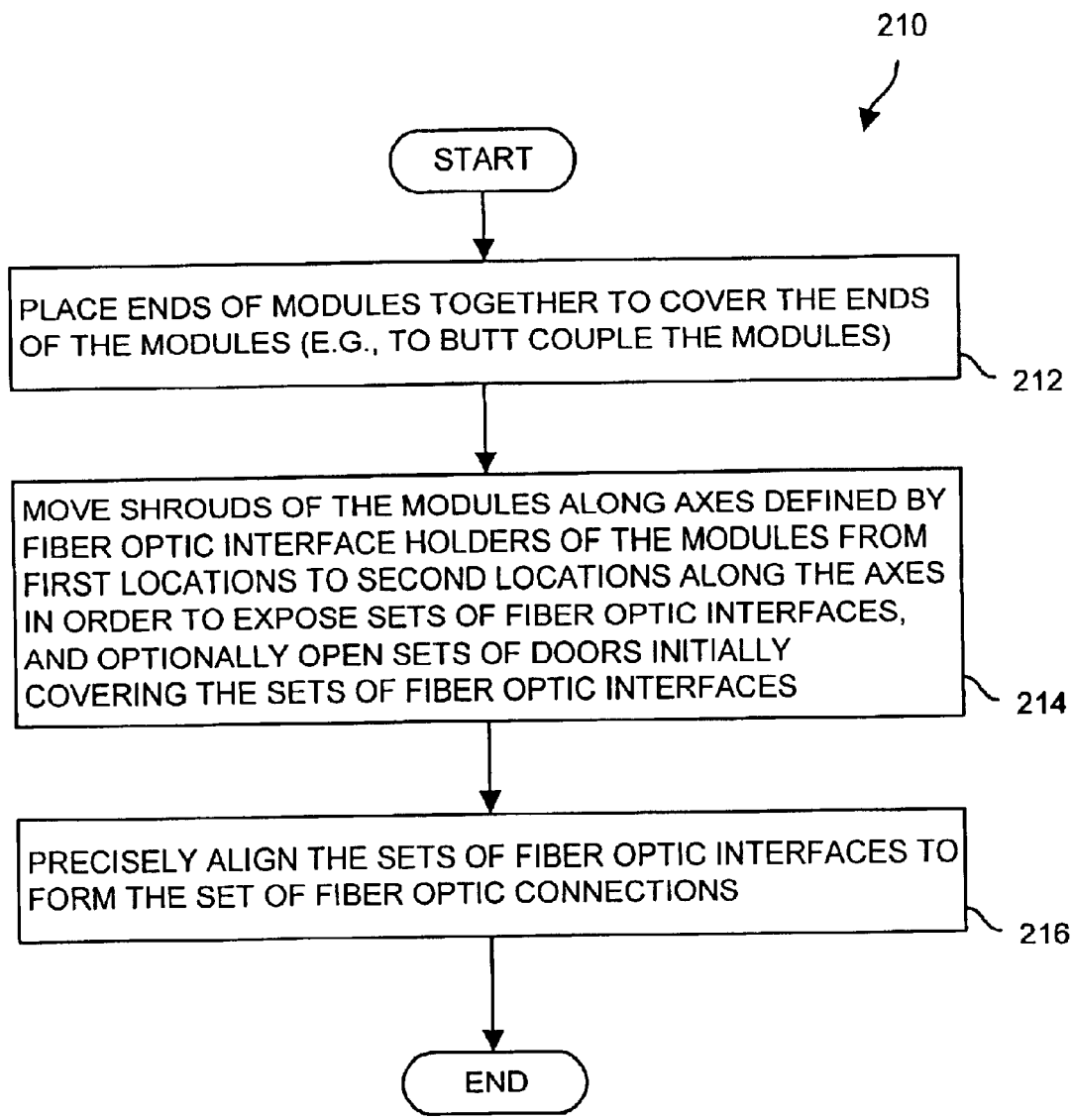
FIG. 8 is a flowchart of a procedure which is performed by a-user when connecting the two modules of FIGS. 7A through 7F.

FIG. 8 shows a flowchart of a procedure 210 for forming a set of fiber optic connections between two fiber optic modules (e.g., one or more fiber optic connections 202 in response to mating of the modules 110-A, 110-B in FIGS. 7A through 7B). Such a procedure 210 is performed by a user when connecting two fiber optic connector assemblies (e.g., when connecting the fiber optic connector assemblies 28, 34 of FIGS. 1A and 1B, or alternatively when connecting the fiber connector assemblies 28, 84 of FIGS. 2 and 3).

In step 212, the user places the ends of the modules together to cover the ends of the modules. For example, with reference to FIGS. 7A and 7B, the user butt couples the modules 110-A, 110-B. Accordingly, the ends are now sealed from the surrounding environment.

In step 214, the user moves the modules closer together thus actuating the module components. Although doors are not necessary for the broadest aspects of the invention, in some arrangements which include doors, the doors open in response forces applied by opposing modules thus uncovering sets of fiber optic interfaces of the modules. Shrouds of the modules move back from initial locations to expose the sets of fiber optic interfaces. For example, with reference to FIGS. 7C through 7E, the doors 186 open and the shrouds 114 move from the locations 136 to the locations 138 along the axes 134 defined by the fiber optic interface holders 112. Since the external regions 182 are sealed from the external surroundings, there is no risk of external contaminants in the surroundings entering the ends and contaminating the sets of fiber optic interfaces.

In step 216, the user precisely aligns the sets of fiber optic interfaces to form the set of fiber optic connections. For example, with reference to FIG. 7F, the set of alignment pins 130 of each ferrule 122 engages into a set of holes of the opposing ferrule 122 to precisely align fiber ends and form the set of fiber optic connections 202. Further details of the invention will now be provided with reference to FIG. 9.

Figure 9:
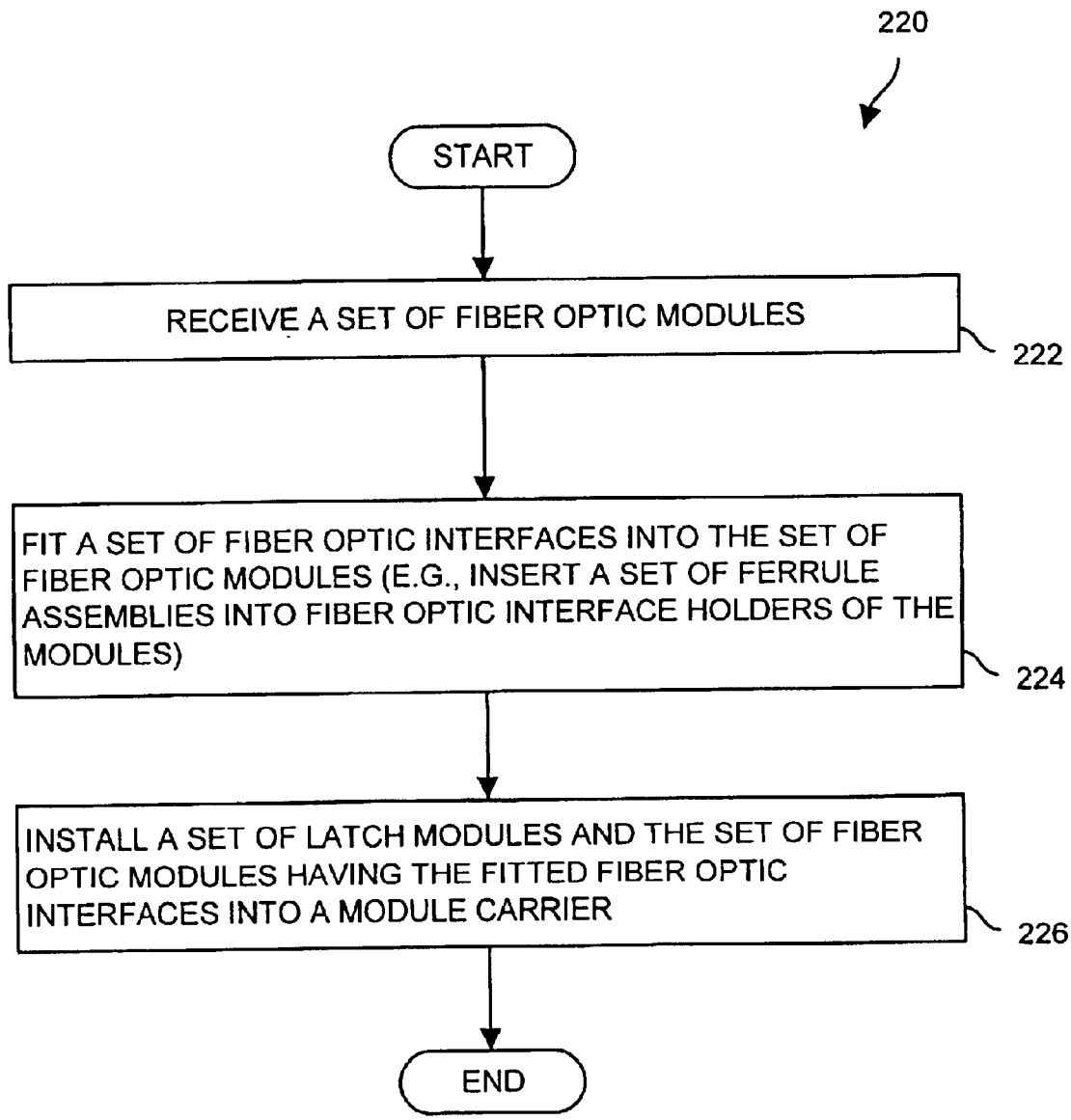
FIG. 9 is a flowchart of a procedure which is performed by a user when making a fiber optic connector assembly which is suitable for use in the connection system of FIGS. 1A and 11B.

FIG. 9 shows a flowchart of a procedure 220 for making a fiber optic assembly. Such a procedure 220 is performed by a user when forming the fiber optic assemblies 28, 34, 84 of FIGS. 1A, 1B, 2 and 3 using modules 110 which are described above (also see the modules 50, 62, 88 which are suitable for use as well).

In step 222, the user receives a set of fiber optic modules 110. At first, the ferrule assemblies 118 are not installed within the fiber optic modules 110.

In step 224, the user fits the ferrules assemblies 118 within the set of fiber optic modules 110. That is, the user inserts each ferrule assembly 118 into a corresponding cavity 146 (see FIG. 5) of each module 110. At this point, the shrouds 114 and the doors 186 shield the fiber optic interfaces 128 of the ferrule assemblies 118 against contaminants and damage from external objects (e.g., the sleeve-shaped support portions 152 of the shrouds 114 extend around the ferrules to protect the ferrules from damage).

In step 226, the user installs a set of latch modules (e.g., see the latch modules 64 of FIG. 2 or the latch modules 90 of FIG. 3) and fiber optic modules 110 into a module carrier (e.g., see the frame 60 of FIG. 2, the housing 46 of FIGS. 1A and 1B, or the housing 86 of FIG. 4). At this point, the fiber optic assembly is complete and ready for connection to another fiber optic assembly.

As described above, the invention is directed to fiber optic connecting techniques, which use a fiber optic module 110 (or alternatively modules 50, 62, 88) that houses a set of fiber optic interfaces 128. The module 110 includes a shroud 114 which protects the set of fiber optic interfaces 128 when in one location 136, and exposes the set of fiber optic interfaces 128 when in another location 138. The shroud 114 can operate in conjunction with a set of doors 186, which actuates in response to shroud movement. Such operation alleviates the need for door actuation in response to ferrule assembly contact as required by conventional fiber optic connectors thus avoiding the risk of ferrule assembly damage. Furthermore, the module 110 can be combined in fiber optic connector assemblies 28, 34, 84 with other modules 110 to form a variety of configurations with minimal or no re-engineering and/or retooling (e.g., a manufacturer can manufacture a first assembly having four modules, and a second assembly having six modules) by simply using different sized module carriers (e.g., a different sized housing or frame for carrying the modules).

Figure 10:
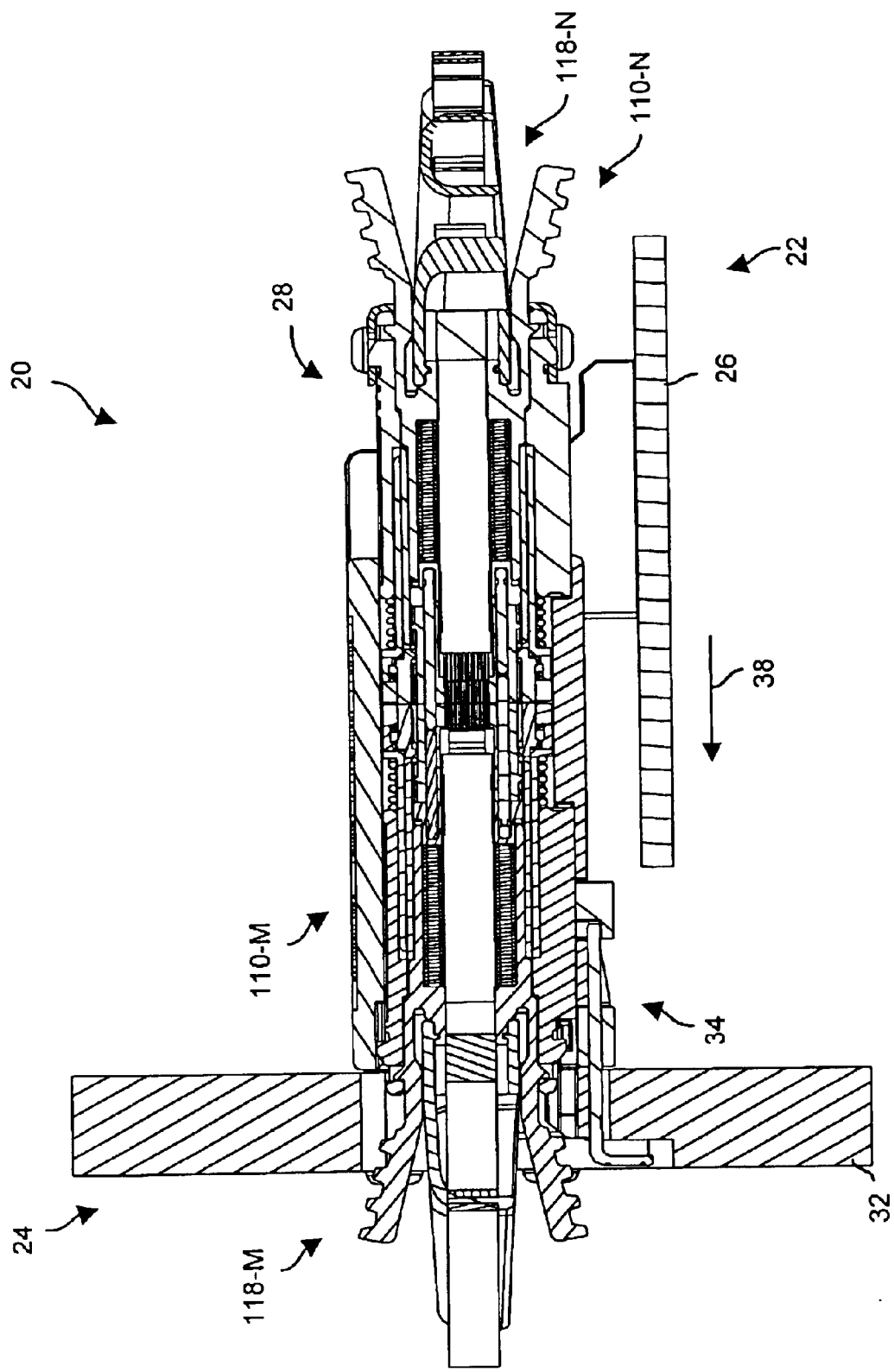
FIG. 10 is a detailed cross-sectional view of to fiber optic connector assemblies made by the procedure of FIG. 9 when installed on circuit boards and connected together to form a set of fiber optic connections.

FIG. 10 shows a detailed view of two fiber optic modules 110-M, 110-N when installed within the fiber optic connector assemblies 28, 34 of FIG. 1B to form the set of fiber optic connections 42 thus illustrating how the module 110 can be used in the context of connecting a fiber optic daughter card 22 to a fiber optic backplane 24. Here, the circuit board 26 of the daughter card 22 moves in the negative Z-direction 38 toward the circuit board 32 of the backplane 24 to mate the two modules 110-M, 110-N.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the fiber optic module 110 having the externally disposed spring 140 of FIGS. 4 through 7F was described as being suitable for use in the fiber optic connector assemblies 24, 34 84 by way of example only. Other fiber optic module designs are suitable for use in these connector assemblies 24, 34 84 as well. In particular, fiber optic modules with internally housed shroud springs can be used instead of the module 110 which has the external shroud spring 140.

Figure 11:
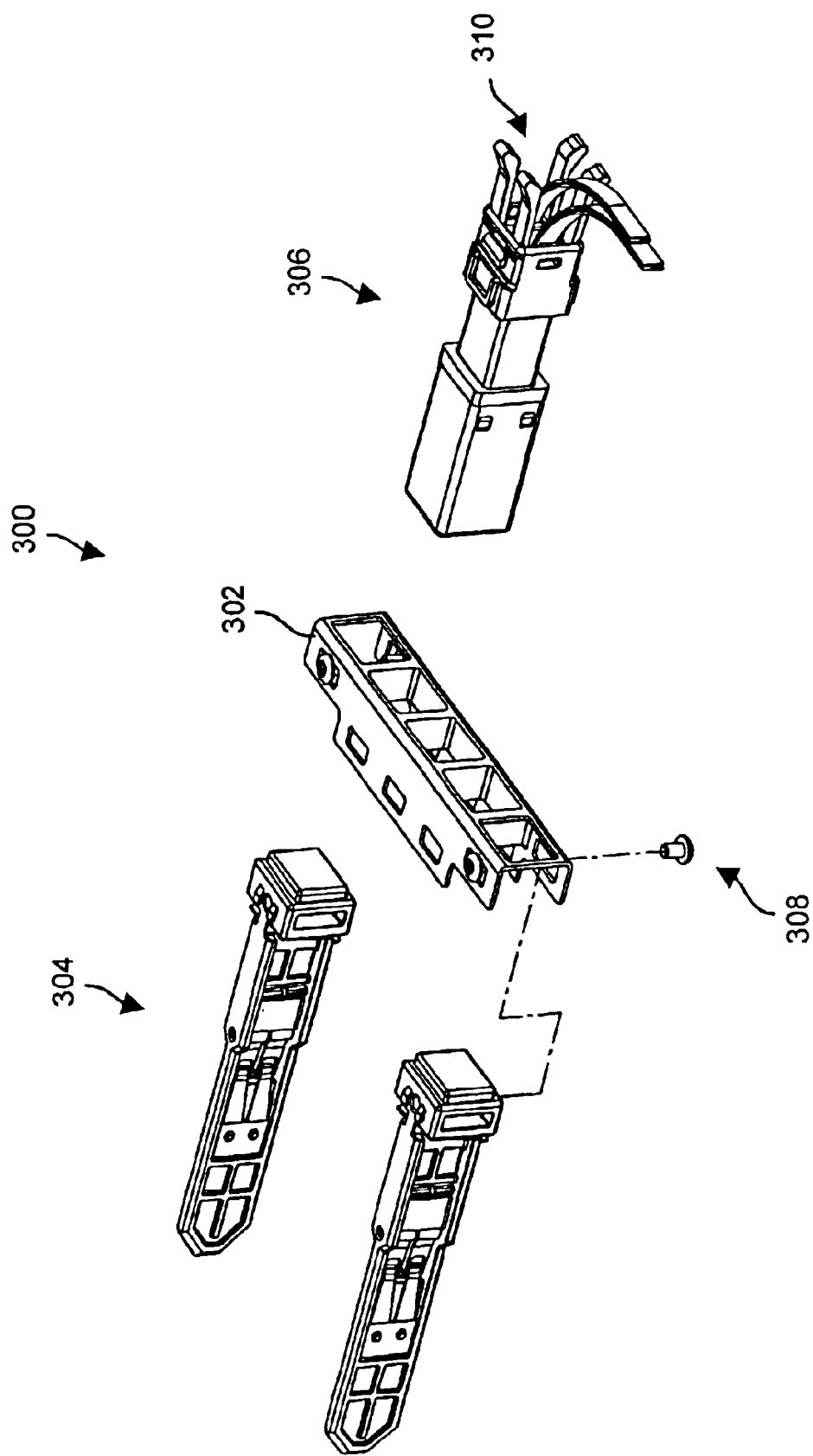
FIG. 11 is a perspective view of an alternative fiber optic connector assembly which is suitable for use by the connection system of FIGS. 1A and 1B.

FIG. 11 shows a fiber optic connector assembly 300 which is similar to the fiber optic connector assembly 28 of FIGS. 1A and 1B. The fiber optic connector assembly 300 includes a frame 302, a set of latch modules 304, a set of fiber optic modules 306, and hardware 308. The components 302, 304, 306 and 308 assemble in a manner similar to that for the assembly 28 (also see FIG. 2). However, in contrast to the modules 62 which is shown with an externally disposed spring, each of the modules 306 has an internally housed shroud spring which is protected by material of the module housing (e.g., from damage due to collecting dirt, from damage caused by contact with an external object, etc.). Although the frame 302 is configured to carry three modules 306, only one module 306 is shown in FIG. 11 for simplicity. Each module 306 is configured to receive a set of ferrule assemblies 310 (i.e., one or more ferrule assemblies 310). Further details of the invention will now be provided with reference to FIGS. 12 and 13.

FIG. 12 shows the fiber optic connector assembly 320 in an exploded state to illustrate how that assembly 320 is assembled. In contrast, FIG. 13 shows the fiber optic connector assembly 320 in a completed state but containing only one fiber optic module 306 to illustrate the modularity of the connector assembly design. The fiber optic connector assembly 320 is similar to the fiber optic connector assemblies 34, 84 of FIGS. 1A, 1B and 3, and is suitable for connecting with the fiber optic connector assemblies 28, 300 described above.

As shown in FIGS. 12 and 13, the fiber optic connector assembly 320 includes a housing 322, a set of the fiber optic modules 306, a set of latch modules 324, a set of ferrule assemblies 310, and hardware 326. As with the connector assembly 84 of FIG. 3, the housing 322 is a two-piece housing. That is, the housing 322 includes a top planar-shaped member 328 and a bottom planar-shaped member 330. The hardware 326 holds the members 328, 330 together enabling the housing 322 to retain the set of fiber optic modules 306 and the set of latch modules 324. Additional hardware can be used to fasten the connector assembly 320 to a circuit board (e.g., see the circuit board 82 of FIG. 3). Further details of the module 306 will now be provided with reference to FIG. 14.

Figure 14:
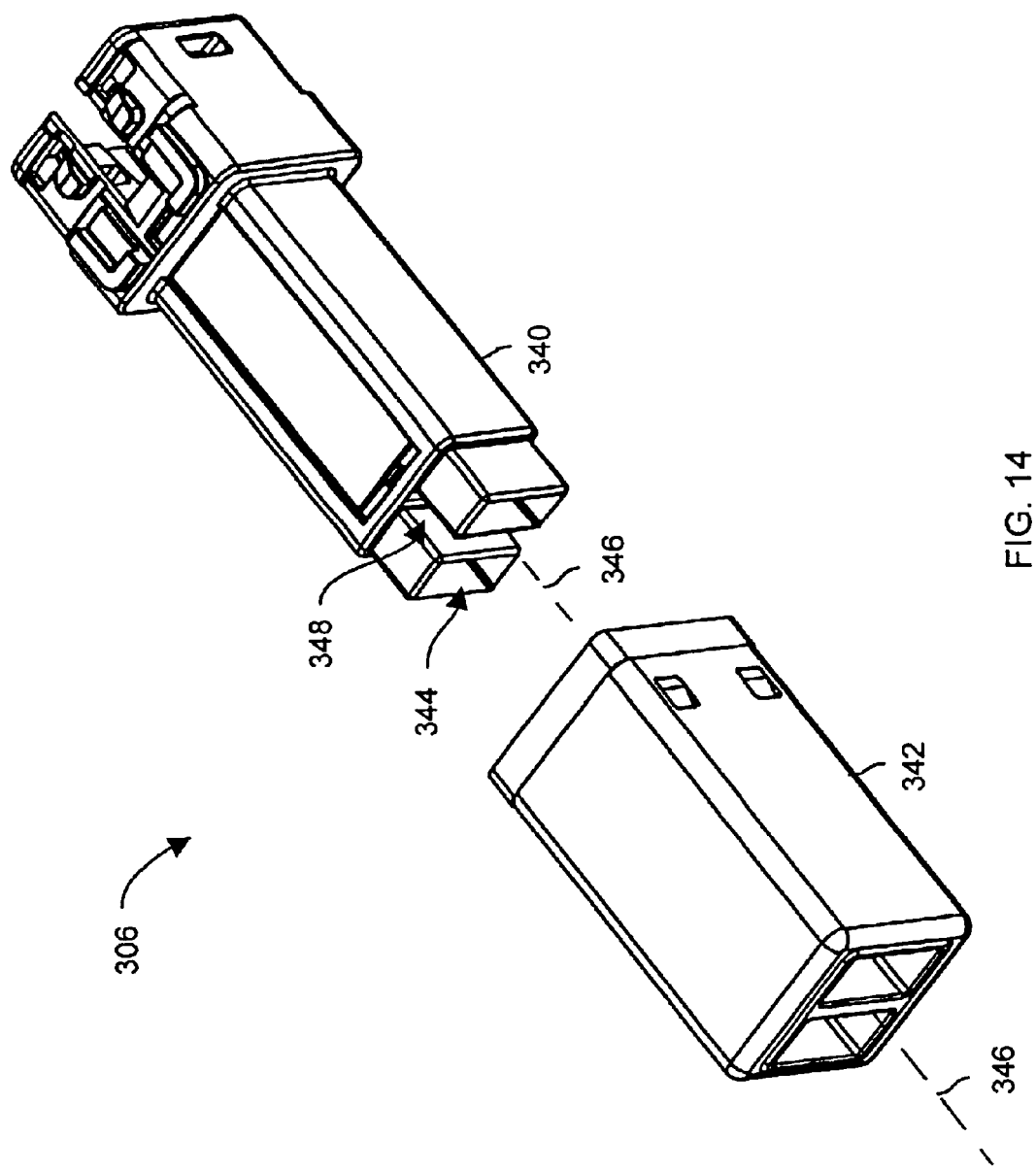
FIG. 14 is a perspective view of a module which is suitable for use by the fiber optic connector assemblies of FIGS. 11 through 13.

FIG. 14 is a partially exploded view of the fiber optic module 306. As shown, the module 306 includes a fiber optic interface holder 340 and a shroud 342, which is coupled to the fiber optic interface holder 340. As with the earlier-described module 110, fiber optic interface holder 340 defines a set of cavities 344 for housing a set of ferrule assemblies 310, and an axis 346. The shroud 342 of the module 306 is configured to move relative to the fiber optic interface holder 340 along the axis 346 between a first location and a second location. When the set of ferrule assemblies 310 is installed within the fiber optic interface holder 340 and when the shroud 342 is in the first location, the shroud 342 protects a set of fiber optic interfaces of the ferrule assemblies 310. In contrast, when the shroud 342 is in the second location, the shroud 342 is more compressed over the fiber optic interface holder 340 and thus exposes the set of fiber optic interfaces. An internally disposed spring 348 (illustrated by the arrow 348 in FIG. 14) biases the shroud 342 to the first location when the module 306 is unconnected. Further details of the invention will now be provided with reference to FIG. 15.

Figure 15:
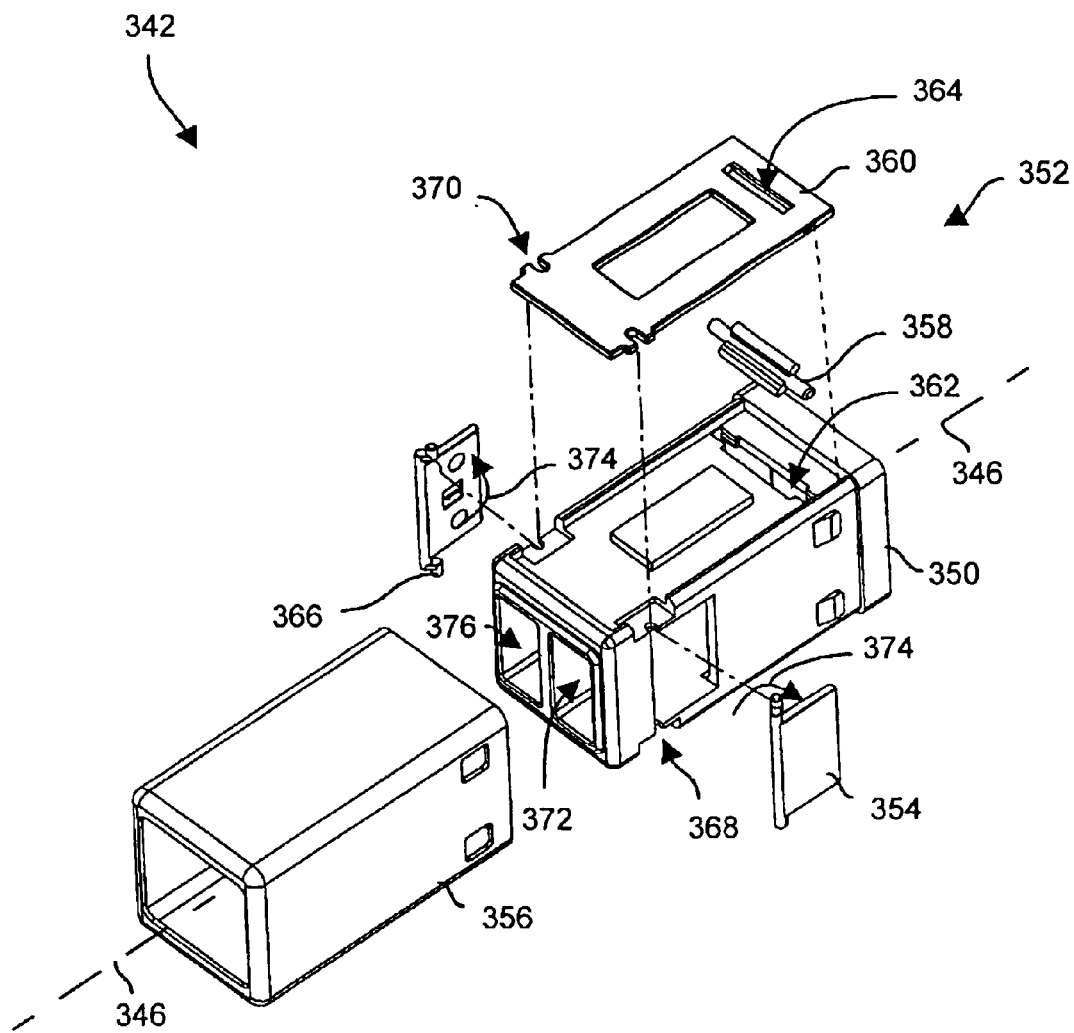
FIG. 15 is an exploded view of a shroud of the module of FIG. 14.

FIG. 15 is an exploded view of the shroud 342 of the module 306. As shown, the shroud 342 includes an inner portion 350, a set of actuation members 352, a set of doors 354 and an outer portion 356. The set of actuation members 352 includes a cam member 358 and a planar member 360. The cam member 358 resides in a slot 362 defined by the inner portion 350. The cam member 358 is configured to engage with a slot 364 defined by the planar member 360. The set of doors 354 include offset hinged arms 366 which reside within notches 368 defined by inner portion 350 and engage other notches 370 defined by the planar member 360. The outer portion 356 covers the other components protecting the components and holding them properly in place.

During operation, the ferrules of the ferrule assemblies 310 sit in individual cavities 374 defined by the fiber optic interface holder 340. Initially, when the module 306 is unconnected, the set of doors 354 is closed thus covering the fiber optic interfaces of the ferrule assemblies 310. Accordingly, the fiber optic interfaces are protected from damage. Furthermore, any light escaping from the fiber optic interfaces will hit the doors 354 rather than escape and possibly cause eye injury to bystanders.

When enough force is applied to the end of the module 306, the internal spring 348 compresses (also see FIG. 14). The shroud 342 moves over the fiber optic interface holder 340 causing the set of doors 354 to open in an inward direction 374 as shown in FIG. 15. That is, the cam member 358 rotates in response to interference from an edge of the fiber optic interface holder 340 (FIG. 14) causing the planar member 360 to move along the plane parallel to the axis 346 (e.g., toward the set of doors 354) thus moving the offset hinged arms 366 of the set of doors 354 and rotating the doors toward the fiber optic interfaces to open the set of doors 354.

It should be understood that the set of doors 354 rotates inwardly toward the fiber optic interfaces by way of example only. In contrast to the module 110 which has a relatively deep set of external regions 182 to accommodate a set of outwardly rotating doors 186 (FIG. 6B), the configuration for the module 306 with a set of inwardly rotating doors 354, alleviates the need for a significant external region 376 at the end of the module 306. Accordingly, there is less likelihood of contaminants collecting at the end of the module 306. Further details of the invention will now be provided with reference to FIGS. 16A through 16E.

FIGS. 16A through 16E illustrate operations of two fiber optic modules 306-A, 306-B when they connect to form a set of fiber optic connections (e.g., see the set of fiber optic connections 42 of FIG. 1B). Although FIGS. 16A through 16E show only one ferrule assembly 310 for each module 306-A, 306-B for simplicity, it should be understood that, in some arrangements, each module 306-A, 306-B actually includes multiple ferrule assemblies 310 (e.g., two ferrule assemblies 310), and that the operations illustrated in FIGS. 16A through 16E apply to each ferrule assembly 310. It should be further understood that the modules 306-A, 306-B can reside in connector assemblies with other modules 306 as well, and that multiple modules 306 can connect together simultaneously to form multiple sets of fiber optic connections. It should be understood that the operating mechanisms are illustrated in one cross-sectional plane for simplicity and that the drive mechanism (e.g., the door actuation mechanism) is in a different plane.

Figure 16A:
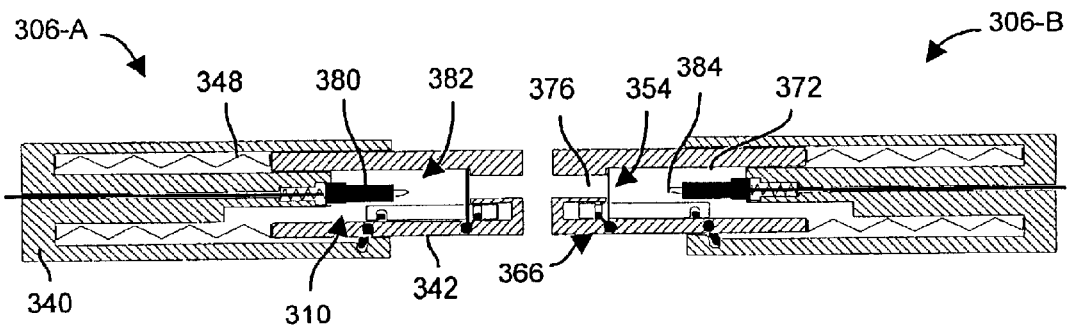
FIG. 16A is a detailed cross-sectional view of two modules having the design of FIG. 14 which are about to mate with each other to form a set of fiber optic connections.

As shown in FIG. 16A, the modules 306-A, 306-B initially face each other. This situation occurs when two fiber optic connector assemblies align just prior to connecting (e.g., also see the fiber optic connector assemblies 28, 34 of FIGS. 1A and 1B). At this time, the sets of module doors 354 are closed due to positioning of the sets of actuation members 352 (also see FIG. 15). In particular, the internally disposed springs 348 bias the shrouds 342 away from the fiber optic interface holders 340 thus orienting the sets of actuation members 352 such that the sets of doors 354 are closed. Accordingly, the sets of doors 354 and the shrouds 342 extend over ferrules 380 of the ferrule assemblies 310 and the ferrules 380 are well shielded against damage (e.g., against contamination, against damage from inadvertent contact with an external object, etc.). In particular, any contaminants in the external regions 376 of the modules 306-A, 306-B are kept away from fiber optic interfaces 382 defined by the ferrules 380. Additionally, the ferrules 380 and alignment pins 384 are protected from damage (e.g., against bending, scratches, etc. from external objects). Furthermore, if any of the modules 306-A, 306-B are active, any light escaping from the ferrules 380 will strike the back sides of the doors 354 rather than escape and possibly cause eye injury to a bystander.

Figure 16B:
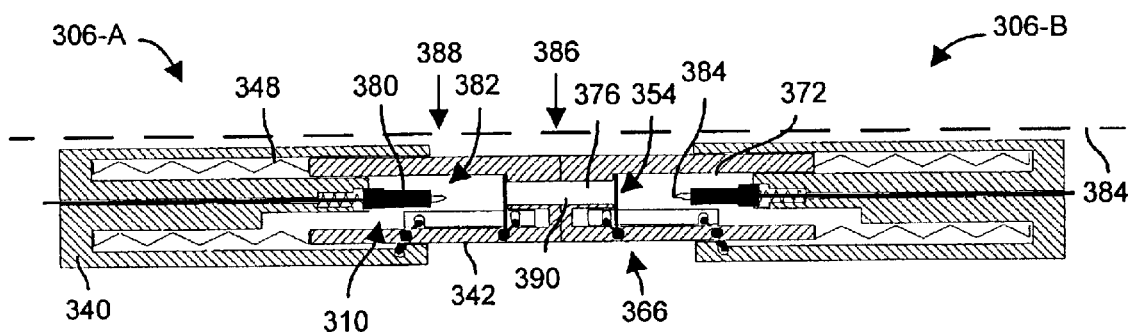
FIG. 16B is a detailed cross-sectional view of the two modules of FIG. 16A in an early butt coupled state where the module doors are still closed.

In FIG. 16B, the modules 306-A, 306-B butt couple to each other. That is, the ends of the modules 306-A, 306-B make contact and any further movement of the modules 306-A, 306-B toward each other results in module compression. It should be understood that the external regions 376 of the modules 306-A, 306-B are now combined to form a single enclosed cavity 390 which is sealed from the external surroundings although the doors 354 are still closed. Accordingly, contaminants (e.g., dust, dirt, grease, etc.) can no longer enter the external regions 376. In one arrangement, users of the modules are urged to clean the external regions 376 prior to connecting the modules as shown in FIGS. 16A and 16B (e.g., blow dry air or inert gas, apply a vacuum, etc.). At this point, the shrouds 342 have not yet compressed into the fiber optic interface holders 340. Accordingly, the shrouds 342 reside at biased locations 386 along axes 384 defined by the modules (only one axis 384 shown for the module 306-A with its shroud at the biased location 386 rather than the compressed location 388).

It should be understood that, in some connection instances, the modules 306-A, 306-B may contact each other abruptly with a high degree of force. In conventional fiber optic connection systems, such blows to between fiber optic connectors may push fiber optic interfaces violently against doors causing damage to the fiber optic interfaces (e.g., bending alignment pins, scratching ferrule ends, etc.). Fortunately, with the module design for the modules 306-A, 306-B, the shrouds 342 are spring-loaded and thus operate as shock-absorbing faces, which dampen the contact forces between the modules 306-A, 306-B. Accordingly, the forces between the modules 306-A, 306-B during connection are less abrupt thus minimizing the potential for damage.

Figure 16C:
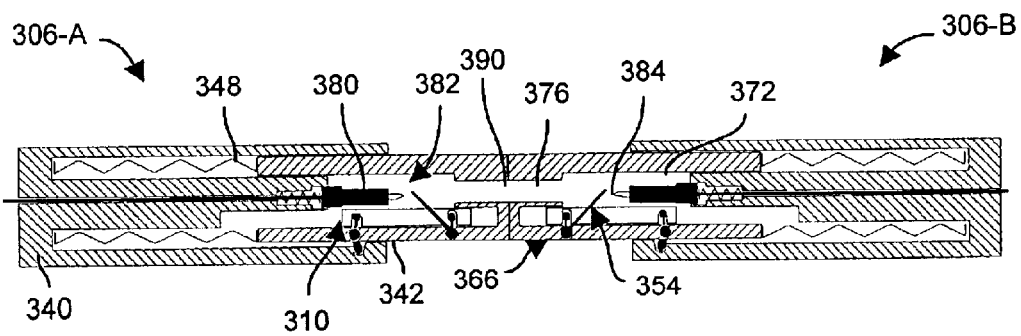
FIG. 16C is a detailed cross-sectional view of the two modules of FIG. 16B in a further butt coupled state, where the module doors are partially opened.

In FIG. 16C, the modules 306-A, 306-B move closer together. As this occurs, each module 306-A, 306-B applies force to the end of the other module 306-A, 306-B. Accordingly, the springs 348 compress in response to the applied forces, and the shrouds 342 move over the fiber optic interface holders 340 thus compressing the modules 306-A, 306-B. As a result, the sets of actuation members 352 move the offset hinged arms 366 of the doors 354 thus opening the doors 354. By way of example, the doors 354 rotate toward the ferrules 380 thus enabling the module design to have minimal size (e.g., depth) for the external regions 376 for reduced surface area for potential contaminant collection, and limiting the size (i.e., length) of the modules 306-A, 306-B.

It should be understood that the doors 354 open without ferrule contact. That is, the doors 354 open in response to the butt coupling force applied to the ends of the shrouds 342 by the opposing module 306-A, 306-B and, as a result, no direct contact from any ferrules 380 is needed to open the doors 354. Accordingly, there is no risk of damaging fiber optic interfaces 382 from door contact as in conventional connectors which require ferrule assemblies to push doors open.

Figure 16D:
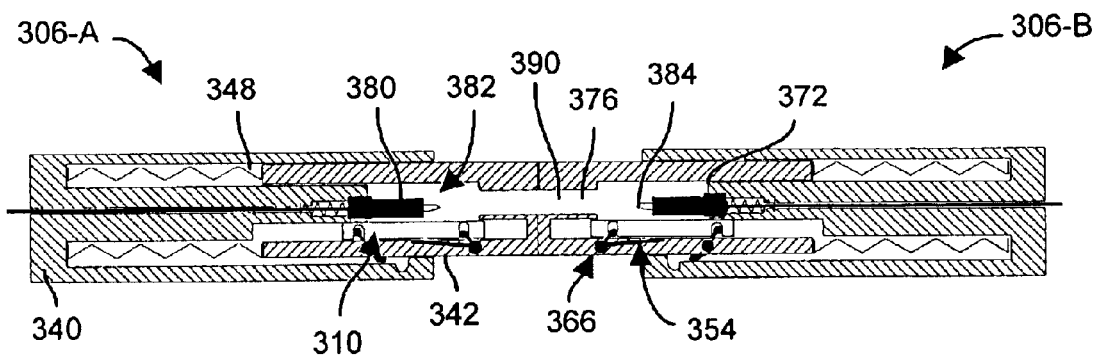
FIG. 16D is a detailed cross-sectional view of the two modules of FIG. 16C in yet a further butt coupled state, where the module doors are fully opened and where the ferrules are moving toward each other.

In FIG. 16D, the doors 354 are fully opened and the modules 306-A, 306-B continue to move toward each other. The springs 348 continue to compress and the shrouds 342 continue to move over the fiber optic interface holders 340 from the biased location 386 toward the location 388 (also compare to FIG. 16B). As a result, the ferrules 380 move out of the inner cavities 372 and toward each other within the single, enclosed cavity 390 formed by the butt coupled external regions 372.

Figure 16E:
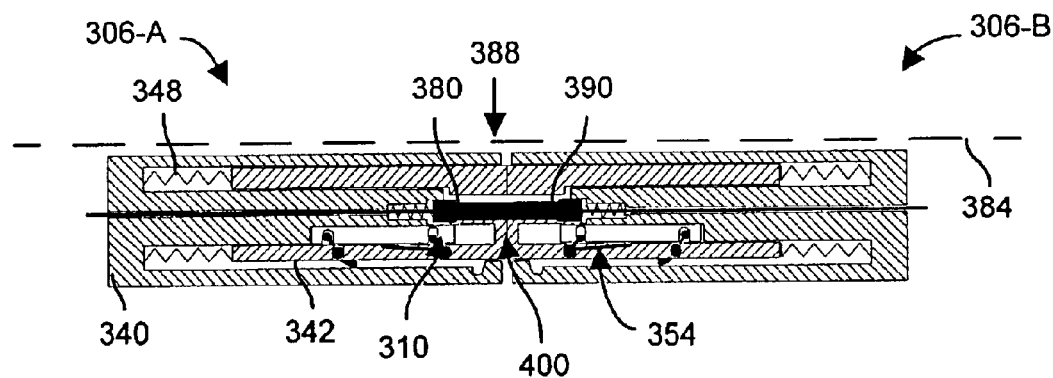
FIG. 16E is a detailed cross-sectional view of the two modules of FIG. 16D when completely connected to form a set of fiber optic connections.

In FIG. 16E, the shrouds 342 have been pushed back to the final locations 388 along the axes 346 thus fully exposing the fiber optic interfaces 382 of the ferrules 380. Here, the ferrules 380 contact each other such that the fiber optic interfaces 382 form a set of robust fiber optic connections 400. In particular, the alignment pins 384 engage corresponding alignment holes in the opposing ferrules 380 to precisely align the fiber ends. Additionally, springs of the ferrule assemblies 310 compress to provide sustained force between the ferrules 380. Furthermore, when the modules 306-A, 306-B are installed within fiber optic connector assemblies with latch modules, it should be understood that, at this point, the modules 306-A, 306-B no longer move toward each other but are competently held together due to proper latching of the latch modules (see FIGS. 1A and 1B). Accordingly, the modules 306-A, 306-B are held together and the formed set of fiber optic connections 400 (i.e., one or more fiber optic connections) is maintained. Such formation of the set of fiber optic connections 400 occurred without any ferrules 380 contacting the doors 354. Thus, risk of damaging the fiber optic interfaces 382 (e.g., bending alignment pins, scratching the fiber optic interface surface, etc.) is avoided.

It should be understood that disconnection of the modules 306-A, 306-B (e.g., un-mating of fiber optic connector assemblies) results in operation of the modules 306-A, 306-B in reverse order. In particular, the ferrules 380 disengage from each other and retract into the inner cavities 372 defined by the shrouds 342 due to biasing of the internally disposed springs 348 which pushes the shrouds 342 away from the fiber optic interface holders 340 and back over the fiber optic interfaces 382. As the shrouds 342 move away from the fiber optic interface holders 340, the sets of actuation members 352 orient to close the sets of doors 354. In particular, the planar members 360 and cam members 358 move offset hinged arms 366 of the doors 354 to rotate the doors 354 from their open positions back to their closed positions (also see FIG. 15). Accordingly, while the modules 306-A, 306-B remain butt coupled thus forming the enclosed cavity 390, the module doors 354 close to further protect the fiber optic interfaces 382. As a result, when the modules 306-A, 306-B are finally moved away from each other thus breaking the sealed cavity 390, the fiber optic interfaces 382 remain isolated from the external surroundings by the shrouds 342 and the sets of doors 354. Thus, the fiber optic interfaces 382 are shielded from contamination, and bystanders remain protected from any light signals emitted from the fiber optic interfaces 382.

Additionally, it should be understood that the procedures 210, 220 described above in connection with the module 110 also apply to the module 306. Moreover, it should be understood that various modifications can be made to the procedures 210, 220 while remaining within the spirit and scope of particular arrangements of the invention. For example, the procedure 220 for forming a fiber optic connector assembly was described above by way of example only. Other similar procedures are suitable for making the fiber optic connector assemblies of the connection system 20. For instance, it is not absolutely necessary that the fiber optic modules be fitted with ferrule assemblies prior to installing the fiber optic modules into a module carrier (e.g., a frame, a housing, etc.). In other arrangements, the fiber optic modules are installed into the module carrier first, and then the ferrule assemblies are fitted into the modules. Also, after the user makes the fiber optic connector assembly, the user can remove a ferrule assembly from a module and either re-plug that same ferrule assembly back into the module or plug a new ferrule assembly into the module.

Furthermore, it should be understood that the above-described connector assemblies were shown as having three centrally disposed fiber optic modules and two peripherally disposed latch modules by way of example only. In other arrangements, there are different numbers of fiber optic modules and/or different numbers of latch modules. Also, in some of these arrangements, one or more latch modules are located between fiber optic modules for enhanced fastening.

Figure 17:
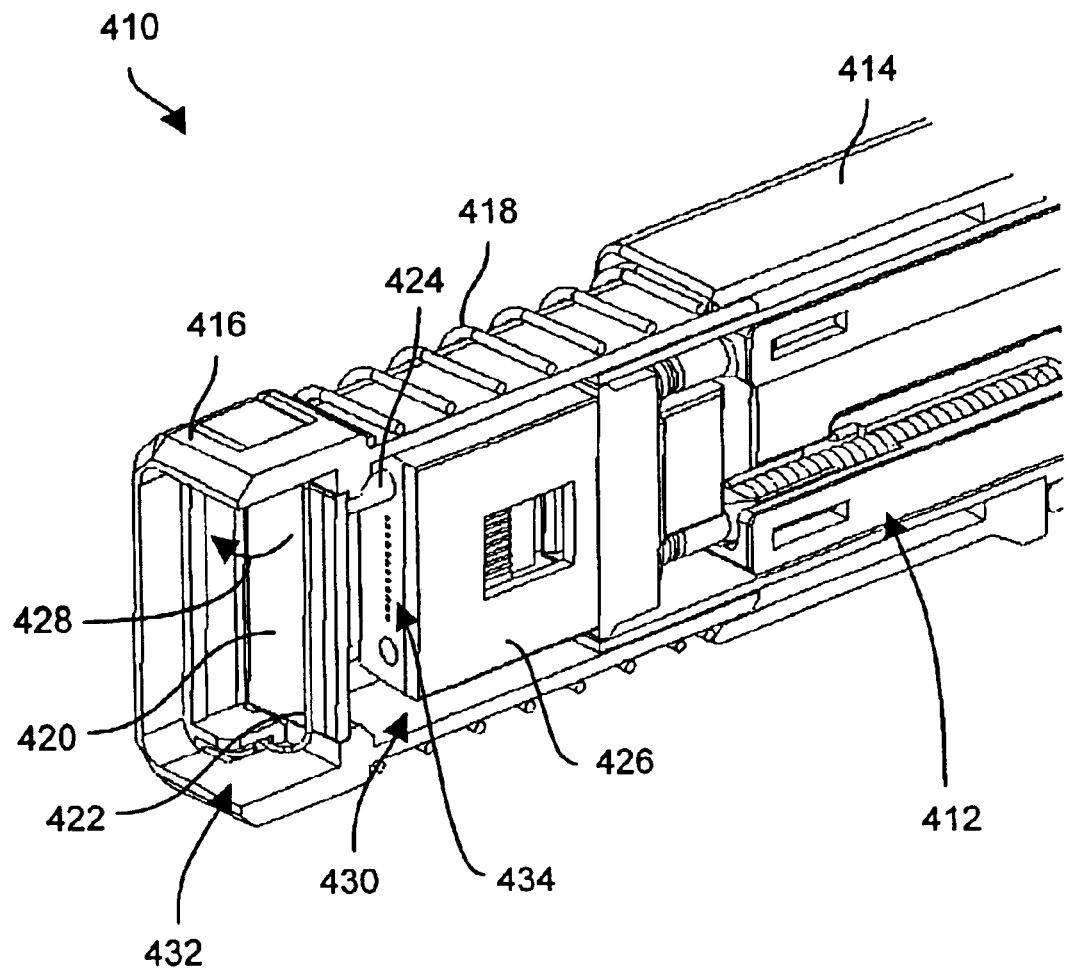
FIG. 17 is a cross-sectional view of a portion of another fiber optic module which is suitable for use by the fiber optic connection system of FIGS. 1A and 1B.

Additionally, it should be understood that some of the above-described module arrangements provide door actuation without the need for contact with a ferrule assembly by way of example only. In other arrangements, a ferrule assembly housed within the fiber optic module contacts a spring-loaded door which couples to the module shroud in order to open that door. FIG. 17 shows a cross-sectional view of a portion of a fiber optic module 410 in accordance with such an arrangement.

As shown in FIG. 17, the module 410 contains a set of ferrule assemblies 412 (i.e., one or more ferrule assemblies 412). The module 410 includes a fiber optic interface holder 414, a shroud 416 that is movable relative to the fiber optic interface holder 414, and a rectilinear spring 418 that biases the shroud 416 away from the fiber optic interface holder 414. The module 410 further includes a set of spring-loaded doors 420 and a set of springs 422 (i.e., one or more doors 420 and one or more springs 422) which are coupled to the shroud 416. The set of springs 422 biases the set of doors 420 to the closed position when the module 410 is unconnected.

When the shroud 416 butt couples with another module 410, the shroud 416 moves backward toward the fiber optic interface holder 414 and the rectilinear spring 418 compresses. Concurrently, a set of alignment pins 424 (i.e., one or more alignment pins 424) extending from a ferrule 426 of each ferrule assembly 412 housed within the module 410 contacts the back side of a corresponding door 420 to push that door 420 open, i.e., rotating the door 420 forward as shown by the arrow 428 in FIG. 17. The ferrule 426 of each ferrule assembly 412 continues to move forward out of an inner cavity 430 toward the external region 432 at the end of the module 410. Since the module 410 is butt coupled with an opposing module, the external region 423 forms a sealed cavity which is shielded from external contaminants. The ferrules 426 continue forward until they connect, i.e., until a set of fiber optic interfaces 434 of each ferrule assembly 412 precisely aligns with a set of opposing fiber optic interfaces to form a set of fiber optic connections.

It should be understood that, when the modules 410 disconnect, each ferrule assembly 412 retracts back into its inner module cavity 430. Accordingly, the set of the spring-loaded doors 420 closes automatically. In particular, the set of springs 422 (e.g., a set of spring clips, leaf springs, etc.) biases the set of doors 420 back to the closed position to shield the set of fiber optic interfaces 434 as the set of alignment pins 424 of the set of retracting ferrules assemblies 412 no longer interferes with the set of doors 420.

It should be further understood that the use of the ferrules 426 to push the set of doors 420 open allows for a more straight-forward operation and, in some respects, simpler operation than other module arrangements. In particular, the set of doors 420 can employ straight hinges rather than offset hinged arms. Additionally, in the arrangement of FIG. 17, there is no need for an actuator mechanism with specialized components. To the contrary, the positioning of the set of alignment pins 424 of the set of ferrule assemblies 412 controls door positioning.

What is claimed is:

1. A module for housing a set of fiber optic interfaces, the module comprising:
 a fiber optic interface holder which is configured to hold the set of fiber optic interfaces; and
 a shroud coupled to the fiber optic interface holder, the shroud being configured to move relative to the fiber optic interface holder along an axis defined by the fiber optic interface holder such that, when the fiber optic interface holder holds the set of fiber optic interfaces, the shroud (i) protects the set of fiber optic interfaces when the shroud is in a first location along the axis defined by the fiber optic interface holder, and (ii) exposes the set of fiber optic interfaces when the shroud is in a second location along the axis defined by the fiber optic interface holder; the shroud including:
- a sleeve coupled to the fiber optic interface holder, the sleeve being configured to move relative to the fiber optic interface holder,
- a face member coupled to the sleeve, the face member being configured to move relative to the sleeve, and
- a set of doors coupled to the face member, each door having a set of lever arms which actuate in response to force on the face member in order to move that door from a closed option to an open position, wherein the set of doors is configured to actuate in response to increasing force on the face member prior to the sleeve moving relative to the fiber optic interface holder.

2. The module of claim 1, further comprising:
a spring which biases the shroud toward the first location along the axis defined by the fiber optic interface holder.

3. The module of claim 1 wherein the fiber optic interface holder is configured to retain a set of ferrule assemblies having a set of ferrules and a set of fiber ends, wherein the set of ferrules and the set of fiber ends define the set of fiber optic interfaces, and wherein the sleeve, when the fiber optic interface holder retains the set of ferrule assemblies and when the shroud is in the first location along the axis defined by the fiber optic interface holder, is configured to extend around the set of ferrules to protect the set of ferrules from damage.

4. The module of claim 1 wherein the shroud defines a front face which is configured to butt couple with another module in order to absorb and apply connection forces during module connection with the other module.

5. The module of claim 1 wherein the fiber optic interface holder is configured to retain a set of ferrule assemblies having a set of ferrules and a set of fiber ends, wherein the set of ferrules and the set of fiber ends define the set of fiber optic interfaces, and wherein the sleeve, in combination with the set of doors, is configured to shield the set of ferrules and the set of fiber ends against contamination.

6. The module of claim 1 wherein the fiber optic interface holder is configured to retain multiple ferrule assemblies.

7. The module of claim 1, further comprising:
a spring which is disposed around at least a portion of one of the fiber optic interface holder and the shroud.

8. The module of claim 1 wherein the shroud defines a front face which is configured to (i) butt couple with another module during module connection with the other module, and (ii) form a sealed cavity around the front face prior to exposure of the set of fiber optic interfaces.

9. The module of claim 1 wherein
the set of doors is configured to open in response to contact with a set of ferrule assemblies which defines the set of fiber optic interfaces when the set of ferrule assemblies is housed within the fiber optic interface holder.

10. The module of claim 1 wherein
each door has a set of lever arms which actuates in response to force on the sleeve in order to move that door from a closed position to an open position.

11. The module of claim 1 wherein each door is configured to rotate toward
the set of fiber optic interfaces in response to force on the shroud when the fiber optic interface holder holds the set of fiber optic interfaces.

12. The module of claim 1 wherein each door is configured to rotate away from the set of fiber optic interfaces in response to force on the shroud when the fiber optic interface holder holds the set of fiber optic interfaces.

13. The module of claim 1 wherein the fiber optic interface holder is configured to retain a set of ferrule assemblies having a set of ferrules and a set of fiber ends; and wherein the set of ferrules and the set of fiber ends define, as the set of fiber optic interfaces, an MT ferrule format.

14. The module of claim 1 wherein the sleeve includes retaining members which are configured to capture and retain the set of doors within the sleeve in order to prevent the set of doors from escaping.

15. A fiber optic connector assembly, comprising:
a set of fiber optic interfaces;
a module carrier; and
a set of modules, each module being installed into the module carrier and having:
- a fiber optic interface holder which is configured to hold a subset of the set of fiber optic interfaces; and
- a shroud coupled to the fiber optic interface holder, the shroud being configured to move relative to the fiber optic interface holder along an axis defined by the fiber optic interface holder such that, when the fiber optic interface holder holds the subset of the set of fiber optic interfaces, the shroud (i) protects the subset of the set of fiber optic interfaces when the shroud is in a first location along the axis defined by the fiber optic interface holder, and (ii) exposes the subset of the set of fiber optic interfaces when the shroud is in a second location along the axis defined by the fiber optic interface; holder the shroud including:
  - a sleeve coupled to the fiber optic interface holder, the sleeve being configured to move relative to the fiber optic interface holder,
  - a face member coupled to the sleeve, the face member being configured to move relative to the sleeve, and
  - a set of doors coupled to the face member, each door having a set of lever arms which actuate in response to force on the face member in order to move that door from a closed position to an open position, wherein the set of doors is configured to actuate in response to increasing force on the face member prior to the sleeve moving relative to the fiber optic interface holder.

16. The fiber optic connector assembly of claim 15 wherein, for each module of the set of modules, the set of doors of the shroud of that module, when the fiber optic interface holder of that module holds the subset of the set of fiber optic interfaces, is configured to selectively close over the subset of the set of fiber optic interfaces and open over the subset of the set of fiber optic interfaces.

17. The fiber optic connector assembly of claim 15 wherein, for each module, the sleeve of that module includes retaining members which are configured to capture and retain the set of doors within the sleeve in order to prevent the set of doors from escaping.

18. A method for making a fiber optic connector assembly, the method comprising the steps of:
receiving a set of fiber optic modules;
fitting a set of fiber optic interfaces into the set of fiber optic modules, each fiber optic module having:
- a fiber optic interface holder which is configured to hold a subset of the set of fiber optic interfaces, and a shroud coupled to the fiber optic interface holder, the shroud being configured to move relative to the fiber optic interface holder along an axis defined by the fiber optic interface holder such that, when the fiber optic interface holder holds the subset of the set of fiber optic interfaces, the shroud (i) protects the subset of the set of fiber optic interfaces when the shroud is in a first location along the axis defined by the fiber optic interface holder, and (ii) exposes the subset of the set of fiber optic interfaces when the shroud is in a second location along the axis defined by the fiber optic interface holder; the shroud including:

a sleeve coupled to the fiber optic interface holder, the sleeve being configured to move relative to the fiber optic interface holder, a face member coupled to the sleeve, the face member being configured to move relative to the sleeve, and a set of doors coupled to the face member, each door having a set of lever arms which actuate in response to force on the face member in order to move that door from a closed position to an open position, wherein the set of doors is configured to actuate in response to increasing force on the face member prior to the sleeve moving relative to the fiber optic Interface holder; and installing a set of latch modules and the set of fiber optic modules having the fitted set of fiber optic interfaces into a module carrier.

19. The method of claim 18, further comprising the step of:

configuring the sleeve of the shroud of a fiber optic module to capture and retain the set of doors of the shroud of that fiber optic module in order to prevent the set of doors from escaping.

20. A method for connecting to a fiber optic module having a module base which holds a set of fiber optic interfaces, the method comprising the steps of:

placing a connecting module against an end of the fiber optic module to cover the end of the fiber optic module;

moving a shroud of the fiber optic module along an axis, which is defined by a fiber optic interface holder coupled to the shroud, from a first location to a second location, the shroud protecting the set of fiber optic interfaces when the shroud is in the first location along the axis, and the shroud exposing the set of fiber optic interfaces when the shroud is in the second location along the axis; the shroud including:

a sleeve coupled to the fiber optic interface holder, the sleeve being configured to move relative to the fiber optic interface holder, a face member coupled to the sleeve, the face member being contoured to move relative to the sleeve, and a set of doors coupled to the face member, each door having a set of lever arms which actuate in response to force on the face member in order to move that door from a closed position to an open position, wherein the set of doors is configured to actuate in response to increasing force on the face member honor to the sleeve moving relative to the fiber optic interface holder, and precisely aligning a set of fiber optic interfaces of the connecting module with the set of fiber optic interfaces to form a set of fiber optic connections.

21. The method of claim 20, further comprising the step of:

opening the set of doors which is initially closed over the set of fiber optic interfaces while the shroud moves along the axis.

22. The method of claim 20, further comprising the step of:

configuring the sleeve of the shroud to capture and retain the set of doors in order to prevent the set of doors from escaping.

* * * * *